(12) United States Patent
Hayashi et al.

(10) Patent No.: US 8,643,960 B2
(45) Date of Patent: Feb. 4, 2014

(54) INTERNAL FOCUS LENS

(75) Inventors: Toshihide Hayashi, Saitama (JP); Naoki Miyagawa, Kanagawa (JP)

(73) Assignees: Sony Corporation, Tokyo (JP); Tamron Co., Ltd., Saitama-shi (JP)

( * ) Notice: Subject to any disclaimer, the term of this patent is extended or adjusted under 35 U.S.C. 154(b) by 87 days.

(21) Appl. No.: 13/466,380

(22) Filed: May 8, 2012

(65) Prior Publication Data

US 2012/0293879 A1 Nov. 22, 2012

(30) Foreign Application Priority Data

May 20, 2011 (JP) ................................. 2011-114188

(51) Int. Cl.
*G02B 9/14* (2006.01)
(52) U.S. Cl.
USPC ............................. 359/786; 359/708; 359/684
(58) Field of Classification Search
USPC ......................................... 359/254, 654–792
See application file for complete search history.

(56) References Cited

U.S. PATENT DOCUMENTS

| 6,081,385 | A | * | 6/2000 | Konno et al. | 359/637 |
| 6,115,188 | A | * | 9/2000 | Nishio et al. | 359/690 |
| 6,421,189 | B1 | | 7/2002 | Sensui | |
| 2009/0190220 | A1 | * | 7/2009 | Sato | 359/557 |

FOREIGN PATENT DOCUMENTS

| JP | 3445554 B2 | 9/2003 |
| JP | 3505099 B2 | 3/2004 |

* cited by examiner

*Primary Examiner* — Thomas K Pham
*Assistant Examiner* — Sharrief Broome
(74) *Attorney, Agent, or Firm* — Foley & Lardner LLP

(57) ABSTRACT

An internal focus lens comprising sequentially from an object side a first lens group having a positive refractive power; a second lens group having a negative refractive power; and a third lens group having a positive refractive power. The second lens group is configured by a simple lens element and is moved along an optical axis to perform focusing. The internal focus lens satisfies condition expressions (1) $0.48 < |f3|/f < 0.73$ and (2) $1.05 < Fno \times f1/f < 1.42$, where f3 is the focal length of the third lens group, f is the focal length of the entire optical system, f1 is the focal length of the first lens group, and Fno is the F number of the entire optical system.

5 Claims, 24 Drawing Sheets

FIRST EMBODIMENT

FIRST EMBODIMENT  FOCUS AT MINIMUM OBJECT DISTANCE

FIG.7 SECOND EMBODIMENT FOCUS AT 0.025× MAGNIFICATION

FIG.8 SECOND EMBODIMENT FOCUS AT MINIMUM OBJECT DISTANCE

FIG.12 THIRD EMBODIMENT FOCUS AT MINIMUM OBJECT DISTANCE

FIFTH EMBODIMENT   FOCUS AT MINIMUM OBJECT DISTANCE

SIXTH EMBODIMENT   FOCUS AT MINIMUM OBJECT DISTANCE

INTERNAL FOCUS LENS

BACKGROUND OF THE INVENTION

1. Field of the Invention

The present invention relates to a compact, large diameter internal focus lens suitable for photographic cameras, video cameras, etc.

2. Description of the Related Art

Conventionally, a large number of internal focus lenses that can be used in photographic cameras and video cameras and that have an intermediate focal length or greater have been proposed (see, for example, Japanese Patent Nos. 3445554 and 3505099).

The internal focus lenses recited in Japanese Patent Nos. 3445554 and 3505099 respectively include sequentially from an object side, a first lens group having a positive refractive power, a second lens group having a negative refractive power, and a third lens group having a positive refractive power; and perform focusing by moving the second lens group.

However, the internal focus lens disclosed in Japanese Patent No. 3445554 has a problem in that the minimum object distance is relatively large and thus, is unsuitable for close-up imaging. A further problem arises in that when a large diameter optical system having an intermediate focal length and satisfying the conditions recited in Japanese Patent No. 3445554 is implemented on a 35 mm equivalent focal length camera, the front lens diameter increases, and reductions in the size of the optical system cannot be realized.

The internal focus lens disclosed in Japanese Patent No. 3505099 has a problem in that since the focusing group is configured by 2 or more lenses, inhibiting reductions in the size and weight of the optical system from being sufficiently realized. In particular, when the focusing group is heavy, the actuator that drives the focusing group also has to be large and consequently, the size of the lens barrel supporting the lens unavoidably increases. Furthermore, when the internal focus lens is implemented on a 35 mm equivalent focal length camera, has an intermediate focal length and satisfies the conditions recited in Japanese Patent No. 3505099, a problem arises in that favorable imaging performance cannot be obtained.

Among such conventional internal focus lenses, including those recited in Japanese Patent Nos. 3445554 and 3505099, none can be said to achieve sufficient size and weight reductions when implemented on a 35 mm equivalent focal length camera and having an intermediate focal length and favorable imaging performance.

SUMMARY OF THE INVENTION

It is an object of the present invention to at least solve the above problems in the conventional technologies.

An internal focus lens according to one aspect of the present invention includes sequentially from an object side a first lens group having a positive refractive power; a second lens group having a negative refractive power; and a third lens group having a positive refractive power. The second lens group is configured by a simple lens element and is moved along an optical axis to perform focusing. The internal focus lens satisfies condition expressions (1) $0.48<|f3|/f<0.73$ and (2) $1.05<Fno \times f1/f<1.42$, where f3 is the focal length of the third lens group, f is the focal length of the entire optical system, f1 is the focal length of the first lens group, and Fno is the F number of the entire optical system.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
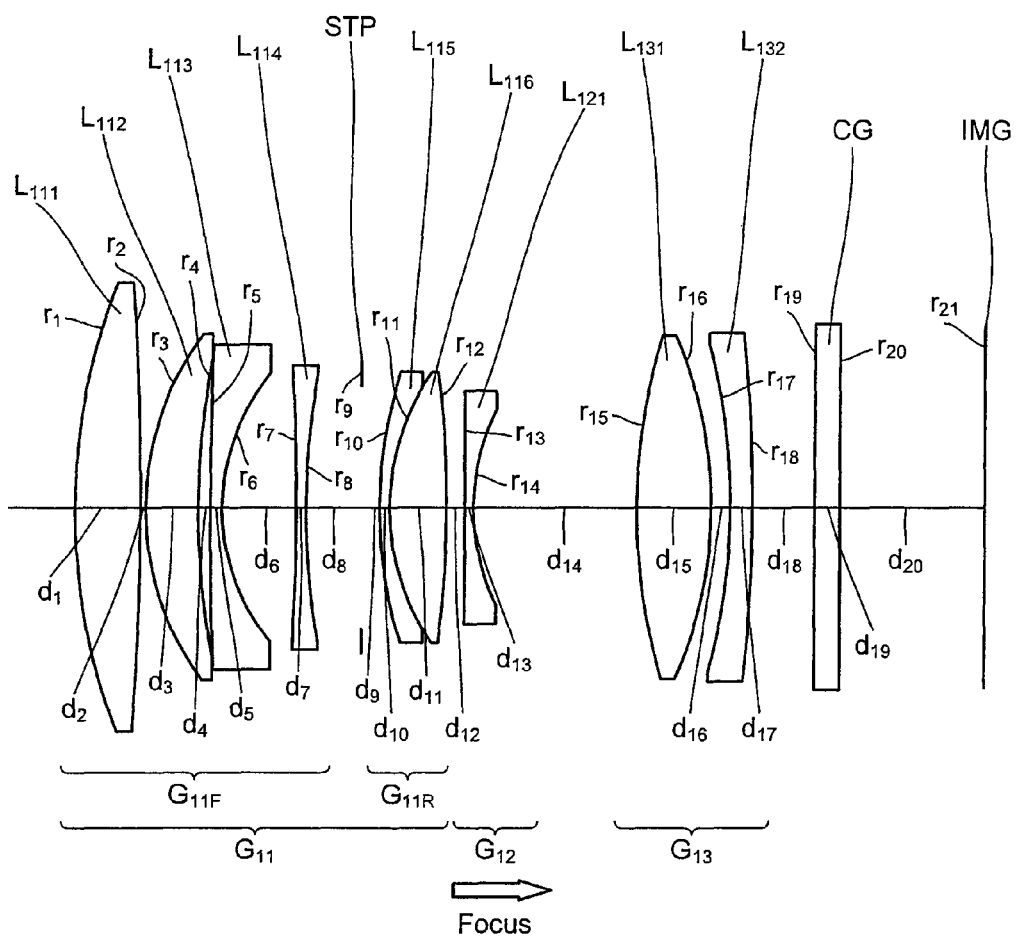
FIG. 1 is a cross sectional view (along an optical axis) of an internal focus lens according to a first embodiment.

With reference to the accompanying drawings, preferred embodiments of an internal focus lens according to the present invention will be described in detail.

An internal focus lens according to the present invention includes sequentially from an object side, a first lens group having a positive refractive power, a second lens group having a negative refractive power, and a third lens group having a positive refractive power.

In general, in the case of achieving wide angle views with a telephoto-type internal focus lens, the adoption of a retrofocus configuration for the first lens group may be considered. However, retrofocus type optical systems have a configuration in which the focal point is moved back by using a negative lens system for a front group and consequently, have a disadvantage in that the total length of the optical system is large. Further, since symmetry of the optical system with respect to the aperture stop is significantly lacking, distortion and coma aberration occurring at the front group (negative lens system) is difficult to correct at a rear group and therefore, favorable aberration correction within the first lens group is difficult perform. Moreover, with conventional telephoto-type internal focus lenses, although the total length of the optical system can be shortened, the symmetry of the optical system with respect to the aperture stop is sacrificed and consequently, aberration correction is difficult.

In contrast, in the internal focus lens according to the present invention, a Sonnar-type configuration is adopted for the first lens group. With a Sonnar-type configuration, the total length of the optical system can be reduced to a greater extent than by a retrofocus configuration. Further, since the symmetry of the optical system with respect to the aperture stop is maintained compared to a retrofocus configuration, favorable aberration correction is possible with a Sonnar-type configuration. In particular, a Sonnar-type configuration offers an advantage in that since favorable aberration correction within the first lens group becomes possible, the configurations of the subsequent second lens group and third lens group can be simplified. In a Sonnar-type optical system, although back focus tends to become shorter, by suitably selecting a refractive power arrangement of the lenses configuring the second lens group and the third lens group, the back focus can be set to a suitable distance.

Next, focusing will be considered. In an optical system configured to have sequentially from the object side, positive, negative, and positive lens groups, when focusing is performed by the first lens group, the heaviest lens group in the optical system has to be moved. Consequently, disadvantages arise in that a larger actuator, which is necessary to drive the lens group, and increased power consumption become unavoidable. In addition, to secure peripheral light when the lens group is extended, a larger lens diameter becomes essential, which impedes optical system size reductions.

On the other hand, if focusing is performed by the third lens group, external force from the exterior of the lens barrel and exerted by the user, such as by the fingers, may damage the drive mechanism for the third lens group. Consequently, a seal member disposed farther on the image side of the system than the third lens group becomes necessary, which is accompanied by increased cost. Further, to correct imaging plane focus displacement accompanying movement toward an object distance of close-up range, the imaging magnification of the third lens group has to be increased. As a result, the back focus of the optical system increases and the size of the optical system unavoidably increases.

To avoid such disadvantages, in the present invention, with the first lens group and the third lens group in a fixed state, focusing is performed by the second lens group disposed inside the optical system. The second lens group has a negative refractive power, whereby through the entire optical system, optical rays can be transmitted through the lowest position. Therefore, the second lens group can be configured by lenses that have the smallest diameters within the optical system, thereby enabling the weights thereof to be reduced as well. Further, by performing focusing by the second lens group disposed inside the optical system, the overall length of the optical system does not change during focusing and thus, is advantageous in reducing the total length of the optical system. Moreover, since the position of the third lens group, which is disposed farthest on the image side of the optical system, a seal member for preventing negative effects of external force becomes unnecessary.

One object of the present invention is to implement an internal focus lens on a 35 mm equivalent focal length camera and having an intermediate (on the order of 75 mm) focal length. Thus, the amount of focus displacement consequent to changes in the object distance, for example, tends to be smaller compared to telephoto lenses and even if the second lens group is configured by a simple lens element, favorable imaging performance can be maintained. Consequent to configuring the second lens group by a simple lens element, the second lens group can be of a lighter and simpler configuration. A simple lens element may be a single polished lens, an aspheric lens, an aspheric compound lens and a cemented lens, and does not include, for example, 2 positive lenses that are not bonded together and have a space therebetween.

In the present invention, to implement an internal focus scheme that is yet smaller, lighter weight and having a large diameter and excellent imaging performance, in addition to the characteristics above, various conditions are set as indicated below.

The internal focus lens according to the present invention preferably satisfies the following conditional expression, where f3 is the focal length of the third lens group, f is the focal length of the entire optical system, f1 is the focal length of the first lens group, and Fno is the F number of the entire optical system.

$$0.48 < |f3|/f < 0.73 \quad (1)$$

$$1.05 < Fno \times f1/f < 1.42 \quad (2)$$

Conditional expression (1) represents a condition for implementing a compact, wide angle optical system. Satisfaction of conditional expression (1) is extremely advantageous in the compactness and wide angle view of the optical system. Below the lower limit of conditional expression (1), the focal length of the third lens group becomes too short with respect to the focal length of the entire optical system and spherical aberration and field curvature become prominent. Meanwhile, above the upper limit of conditional expression (1), the back focus of the optical system increases and reductions in the size of the optical system are impeded. In addition, a wide angle view becomes difficult to achieve.

Conditional expression (2) represents a condition for implementing a compact, large diameter optical system.

Below the lower limit of conditional expression (2), although the focal length of the first lens group becomes shorter, whereby the F number becomes smaller, which are advantageous in implementing a bright lens, distortion also becomes prominent, which is undesirable. Meanwhile, above the upper limit of conditional expression (2), the back focus of the optical system increases and reductions in the size of the optical system are impeded. In addition, a wide angle view becomes difficult to achieve.

If conditional expressions (1), (2) are within the following ranges, more favorable results can be expected.

$$0.54<|f3/f<0.73 \tag{1}'$$

$$1.18<Fno \times f1/f<1.42 \tag{2}'$$

By satisfying conditional expressions (1)', (2)', reduction of the overall length of the optical system can be achieved and imaging performance can be further improved.

If conditional expressions (1)', (2)' are within the following ranges, yet more favorable results can be expected.

$$0.59<|f3|/f<0.72 \tag{1}''$$

$$1.30<Fno \times f1/f<1.42 \tag{2}''$$

By satisfying conditional expressions (1)'', (2)'', reduction of the overall length of the optical system can be achieved and imaging performance can be further improved.

In the internal focus lens according to the present invention, the third lens group includes at least 1 positive lens and has a negative lens disposed nearest the image. The third lens group has a configuration that includes sequentially from the object side, a positive lens and a negative lens, whereby compared to a configuration that includes a negative lens and positive lens sequentially from the object side, the back focus of the optical system becomes shorter, enabling a reduction in the overall length of the optical system. Spherical aberration, coma aberration, and field curvature occurring at the surface on the image side of the positive lens disposed on the object side can be corrected by the surface on the object side of the negative lens disposed on the image side.

In addition, the following conditional expression is preferably satisfied, where f3n is the focal length of the negative lens disposed farthest on the image side of the third lens group and f is the focal length of the entire optical system.

$$0.85<|f3n|/f<2.40 \tag{3}$$

Conditional expression (3) represents a condition for improving imaging performance without inhibiting reductions in the size of the optical system. Below the lower limit of conditional expression (3), the negative refractive power in the third lens group becomes too strong, spherical aberration and field curvature consequent to convergence far beyond the focal length result and correction thereof becomes difficult. Meanwhile, above the upper limit of conditional expression (3), the negative refractive power in the third lens group becomes too weak, spherical aberration and field curvature consequent to convergence far short of the focal length result and correction thereof becomes difficult.

If conditional expression (3) is within the following range, more favorable results can be expected.

$$0.96<|f3n|/f<2.19 \tag{3}'$$

By satisfying conditional expression (3)', even better imaging performance can be obtained without inhibiting reductions in the size of the optical system.

If conditional expression (3)' is within the following range, yet more favorable results can be expected.

$$1.05<|f3n|/f<2.00 \tag{3}''$$

By satisfying conditional expression (3)', the imaging performance can be improved further without inhibiting reductions in the size of the optical system.

The internal focus lens according to the present invention preferably satisfies the following conditional expression, where f2 is the focal length of the second lens group and f is the focal length of the entire optical system.

$$0.38<|f2|/f<0.72 \tag{4}$$

Conditional expression (4) represents a condition for implementing an optical system that is compact and has excellent imaging performance. Below the lower limit of conditional expression (4), the negative refractive power of the second lens group becomes too strong, spherical aberration and field curvature consequent to convergence far beyond the focal length result and correction thereof becomes difficult. Meanwhile, above the upper limit of conditional expression (4), the negative refractive power of the second lens group becomes too weak, and the focus stroke of the second lens group increases. As a result, the overall length of the optical system increases and thus, is undesirable. If the overall length of the optical system is reduced with the weak refractive power of the second lens group as is, during close-up imaging, the third lens group obstructs the movement of the second lens group, which is the focusing group, and a reduction of the minimum object distance becomes difficult.

If conditional expression (4) is within the following range, more favorable results can be expected.

$$0.42<|f2|/f<0.66 \tag{4}'$$

By satisfying conditional expression (4)', even better imaging performance can be obtained without inhibiting reductions in the size of the optical system.

If conditional expression (4)' is within the following range, yet more favorable results can be expected.

$$0.46<|f2|/f<0.61 \tag{4}''$$

By satisfying conditional expression (4)'', imaging performance can be improved further without inhibiting reductions in the size of the optical system.

The internal focus lens according to the invention preferably satisfies the following conditional expression, where nd is refractive index of the second lens group at d-line, υ is the Abbe number of the second lens group at the d-line.

$$nd \geq 1.603 \tag{5}$$

$$\upsilon d > 60.3 \tag{6}$$

Conditional expression (5) represents a condition for implementing an optical system that is compact and has excellent imaging performance. Below the lower limit of conditional expression (5), to compensate for the drop in the refractive index of the second lens group, the curvature of the lenses configuring the second lens group has to be increased and as a result, spherical aberration becomes prominent and thus, is undesirable. Further, if lens curvature is increased, lens weight also increases, which impedes reductions in the weight of the optical system. To drive heavy lenses, a more powerful, larger actuator becomes necessary, which contributes to increases in the size of the lens barrel. If a low lens curvature is maintained with the low refractive index of the second lens group as is, the refractive power of the lens decreases, the focus stroke of the second lens group, which is focusing group, increases, and reductions in the size of the optical system are inhibited.

Conditional expression (6) represents a condition to effectively control the occurrence of chromatic difference of magnification. Below the lower limit of conditional expression (6), the variation of chromatic difference of magnification consequent to focusing increases and favorable resolution from the infinity focus state to a focus state at the minimum object distance cannot be achieved.

Further, when the internal focus lens is implemented on a 35 mm equivalent focal length camera and has an intermediate focal length (on the order of 75 mm), the aperture stop is disposed within the first lens group. More preferably, the first lens group is divided into a front group and a rear group, and the aperture stop is disposed therebetween. If the lenses are disposed substantially symmetrically about the aperture stop, proper correction of various types of aberration is facilitated. Further, the disposal of the aperture stop within the first lens group not only adequately corrects various types of aberration, but is useful in that the front lens diameter can be reduced since the aperture stop is positioned toward the front (object side) of the optical system.

Based on this viewpoint, in the internal focus lens according to the present invention, the first lens group includes sequentially from the object side, a front group having a negative refractive power, an aperture stop, and a rear group having a positive refractive power. In particular, disposal of a strong negative lens group (diverging group) on the object side of the aperture stop and a strong positive lens group (converging group) on the image side of the aperture stop (thereby sandwiching the aperture stop), for example, enables spherical aberration that tends to be on the over side by diverging group to be returned to the under side by the converging group, thereby enabling even better aberration correction. Further, since aberration correction is possible within the first lens group, the lens configurations of the subsequent second lens group and third lens group can be simplified.

In the case of a large diameter lens (e.g., an F number of 1.8 or less), the height of a light beam on an axis that passes in proximity to the aperture stop becomes relatively large compared to a lens for which the F number exceeds 1.8. Consequently, it is difficult to correct axial chromatic aberration by merely disposing 1 convex lens after (on the image side of) the aperture stop. Thus, in the present invention, the rear group of the first lens group includes a cemented lens formed by a negative lens and a positive lens. By such a configuration, axial chromatic aberration can be corrected favorably and an optical system that has a large diameter and excellent resolution can be implemented. The cemented lens, as described above, has to have a positive refractive power and therefore, the positive lens has to have a large refractive index compared to the negative lens.

As described, the internal focus lens according to the present invention includes the second lens group, which is responsible for focusing and is configured by a simple lens element, and maintains the first lens group and the third lens group in a fixed state, thereby enables a light-weight optical system of a relatively short length to be implemented. Further, disposal of the aperture stop at a proper position within the first lens group effects excellent correction of various types of aberration and further enables the front lens diameter of the optical system to be reduced. By further satisfying the conditional expressions above, an internal focus lens that is yet smaller, lighter, and has excellent imaging performance can be implemented.

With reference to the accompanying drawings, embodiments of the internal focus lens according to the present invention will be described in detail. However, the invention is not limited to the following embodiments.

FIG. 1 is a cross sectional view (along an optical axis) of the internal focus lens according to a first embodiment. The internal focus lens includes sequentially from a side nearest a non-depicted object (object side), a first lens group $G_{11}$ having a positive refractive power, a second lens group $G_{12}$ having a negative refractive power, and a third lens group $G_{13}$ having a positive refractive power. Between the third lens group $G_{13}$ and an imaging plane IMG, a cover glass CG is disposed. The cover glass CG is disposed as necessary and may be omitted when not necessary. At the imaging plane IMG, the light receiving surface of an imaging sensor such as a CCD, CMOS, etc. is disposed.

The first lens group $G_{11}$ includes sequentially from the object side, a front group $G_{11F}$ having a negative refractive power, an aperture stop STP prescribing a given aperture, and a rear group $G_{11R}$ having a positive refractive power. The front group $G_{11F}$ includes sequentially from the object side, a positive lens $L_{111}$, a positive lens $L_{112}$, a negative lens $L_{113}$, and a negative lens $L_{114}$. The rear group $G_{11R}$ includes sequentially from the object side, a negative lens $L_{115}$ and a positive lens $L_{116}$. The negative lens $L_{115}$ and the positive lens $L_{116}$ are cemented. The lens configuration of the first lens group $G_{11}$ is substantially symmetrical about the aperture stop STP. The first lens group $G_{11}$ is fixed and does not move during focusing.

The second lens group $G_{12}$ is configured by a negative lens $L_{121}$. The second lens group $G_{12}$ is moved along the optical axis, from the object side toward the imaging plane IMG, whereby focusing from infinity focus to focus at the minimum object distance is performed.

The third lens group $G_{13}$ includes sequentially from the object side, a positive lens $L_{131}$ and negative lens $L_{132}$. The third lens group $G_{13}$ is also fixed and does not move during focusing.

Here, various values related to the internal focus lens according to the first embodiment are given.

| (Lens Data) | | |
|---|---|---|
| $r_1$ = 48.1515 | | |
| $d_1$ = 5.2207 | $nd_1$ = 1.83481 | $vd_1$ = 42.72 |
| $r_2$ = −237.5887 | | |
| $d_2$ = 0.4000 | | |
| $r_3$ = 22.5541 | | |
| $d_3$ = 4.1870 | $nd_2$ = 1.83481 | $vd_2$ = 42.72 |
| $r_4$ = 62.9964 | | |
| $d_4$ = 0.9458 | | |
| $r_5$ = 353.7688 | | |
| $d_5$ = 0.9000 | $nd_3$ = 1.72825 | $vd_3$ = 28.32 |
| $r_6$ = 16.2995 | | |
| $d_6$ = 5.8298 | | |
| $r_7$ = −223.8200 | | |
| $d_7$ = 0.8000 | $nd_4$ = 1.72825 | $vd_4$ = 28.32 |
| $r_8$ = 58.8652 | | |
| $d_8$ = 4.4211 | | |
| $r_9$ = ∞ (aperture stop) | | |
| $d_9$ = 1.5000 | | |
| $r_{10}$ = 35.1152 | | |
| $d_{10}$ = 0.8000 | $nd_5$ = 1.84666 | $vd_5$ = 23.78 |
| $r_{11}$ = 18.5361 | | |
| $d_{11}$ = 4.5620 | $nd_6$ = 1.91082 | $vd_6$ = 35.25 |
| $r_{12}$ = −85.6043 | | |

-continued

| | | |
|---|---|---|
| $d_{12}$ = D(12) (variable) | | |
| $r_{13}$ = −1338.6600 | | |
| $d_{13}$ = 0.7000 | $nd_7$ = 1.603 | $vd_7$ = 65.44 |
| $r_{14}$ = 17.2722 | | |
| $d_{14}$ = D(14) (variable) | | |
| $r_{15}$ = 46.1315 | | |
| $d_{15}$ = 5.8712 | $nd_8$ = 1.72916 | $vd_8$ = 54.67 |
| $r_{16}$ = −33.7985 | | |
| $d_{16}$ = 1.5218 | | |
| $r_{17}$ = −48.8753 | | |
| $d_{17}$ = 1.8000 | $nd_9$ = 1.80809 | $vd_9$ = 22.76 |
| $r_{18}$ = −125.8764 | | |
| $d_{18}$ = 5.0000 | | |
| $r_{19}$ = ∞ | | |
| $d_{19}$ = 2.0000 | $nd_{10}$ = 1.5168 | $vd_{10}$ = 64.2 |
| $r_{20}$ = ∞ | | |
| $d_{20}$ = 11.5801 | | |
| $r_{21}$ = ∞ (imaging plane) | | |

(Values for focusing states)

| | Infinity | 0.025x | Min. object dist. (0.138x) |
|---|---|---|---|
| D(12) | 1.502 | 2.219 | 5.589 |
| D(14) | 12.915 | 12.199 | 8.829 |
| image height(Y) | 14.20 | 14.20 | 14.20 | f (focal length of entire optical system) = 51.50
Fno = 1.81
ω (half-angle) = 15.41
minimum object distance = 0.450
f1(focal length of first lens group $G_{11}$) = 37.32
f2(focal length of second lens group $G_{12}$) = −28.27
f3(focal length of third lens group $G_{13}$) = 36.94
f3n(focal length of negative lens $L_{132}$) = −99.91
(Values related to conditional expression (1))
|f3|/f = 0.71
(Values related to conditional expression (2))
Fno × f1/f = 1.31
(Values related to conditional expression (3))
|f3n|/f = 1.94
(Values related to conditional expression (4))
|f2|/f = 0.55
(Values related to conditional expression (5))
nd(refractive index at d-line of second lens group $G_{12}$) = 1.603
(Values related to conditional expression (6))
vd(Abbe number at d-line of second lens group $G_{12}$) = 65.44

Figure 2:
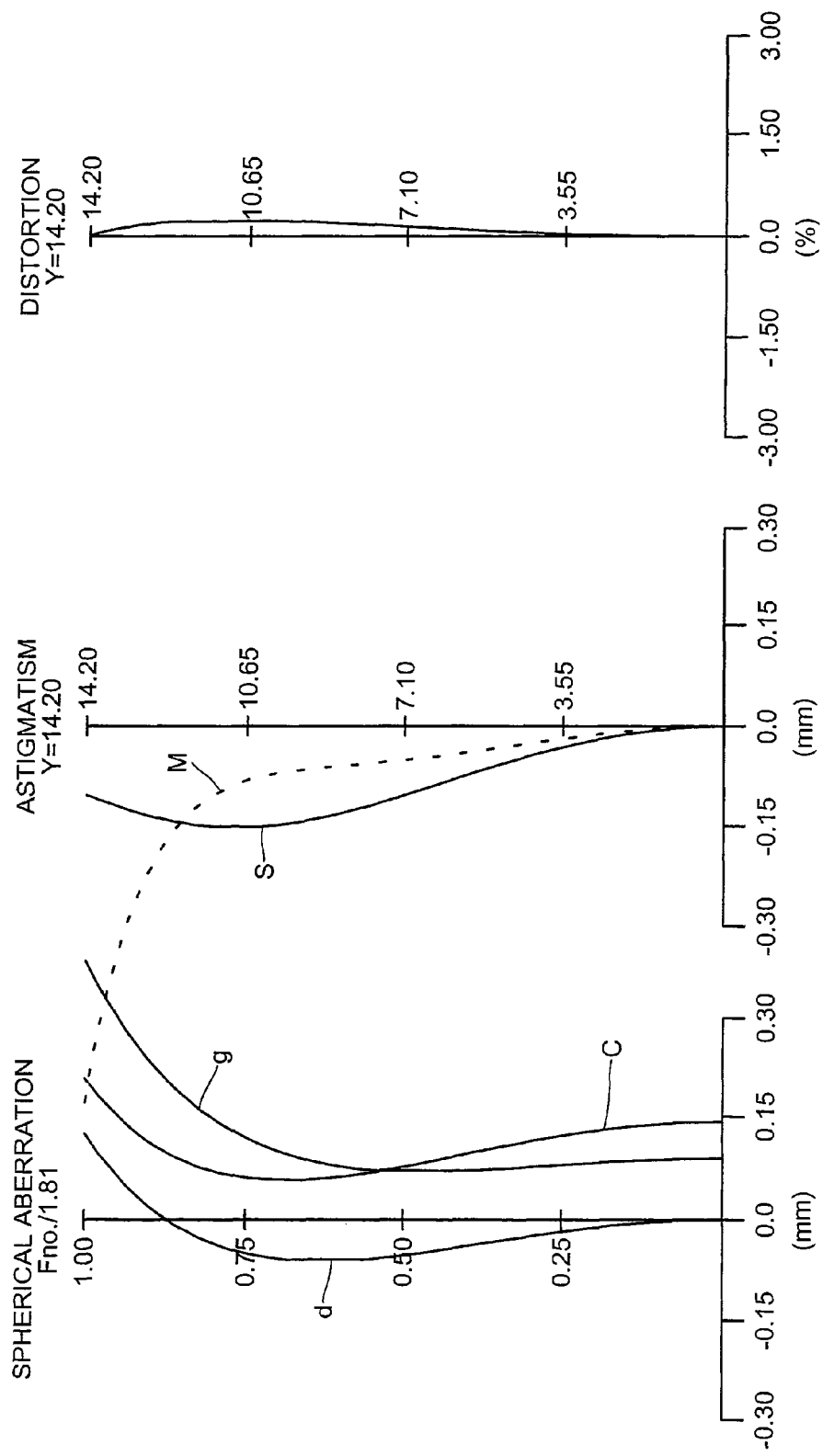
FIG. 2 is a diagram of various types of aberration occurring at infinity focus in the internal focus lens according to the first embodiment.
Figure 3:
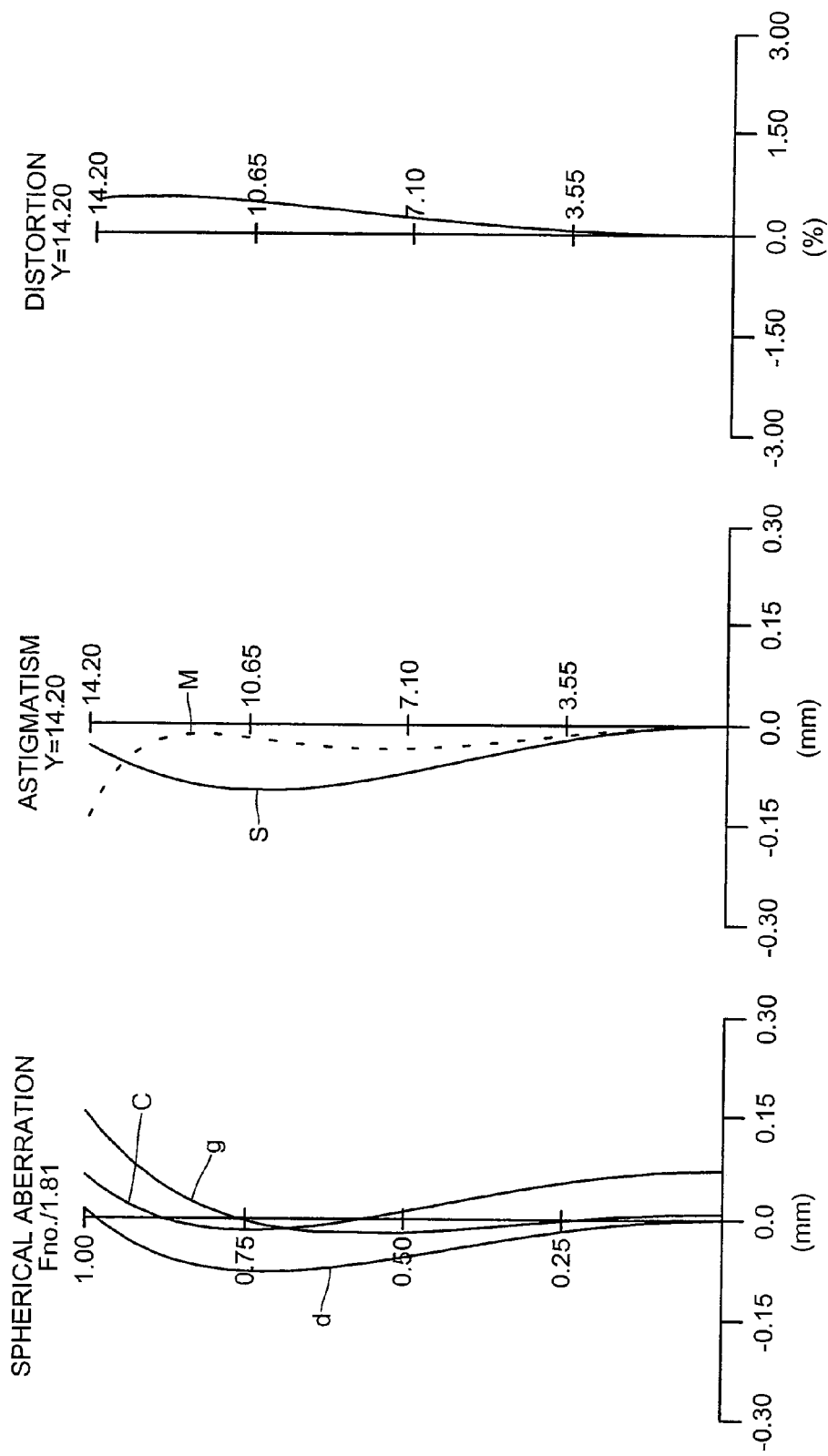
FIG. 3 is a diagram of various types of aberration occurring with focusing at 0.025× magnification in the internal focus lens according to the first embodiment.
Figure 4:
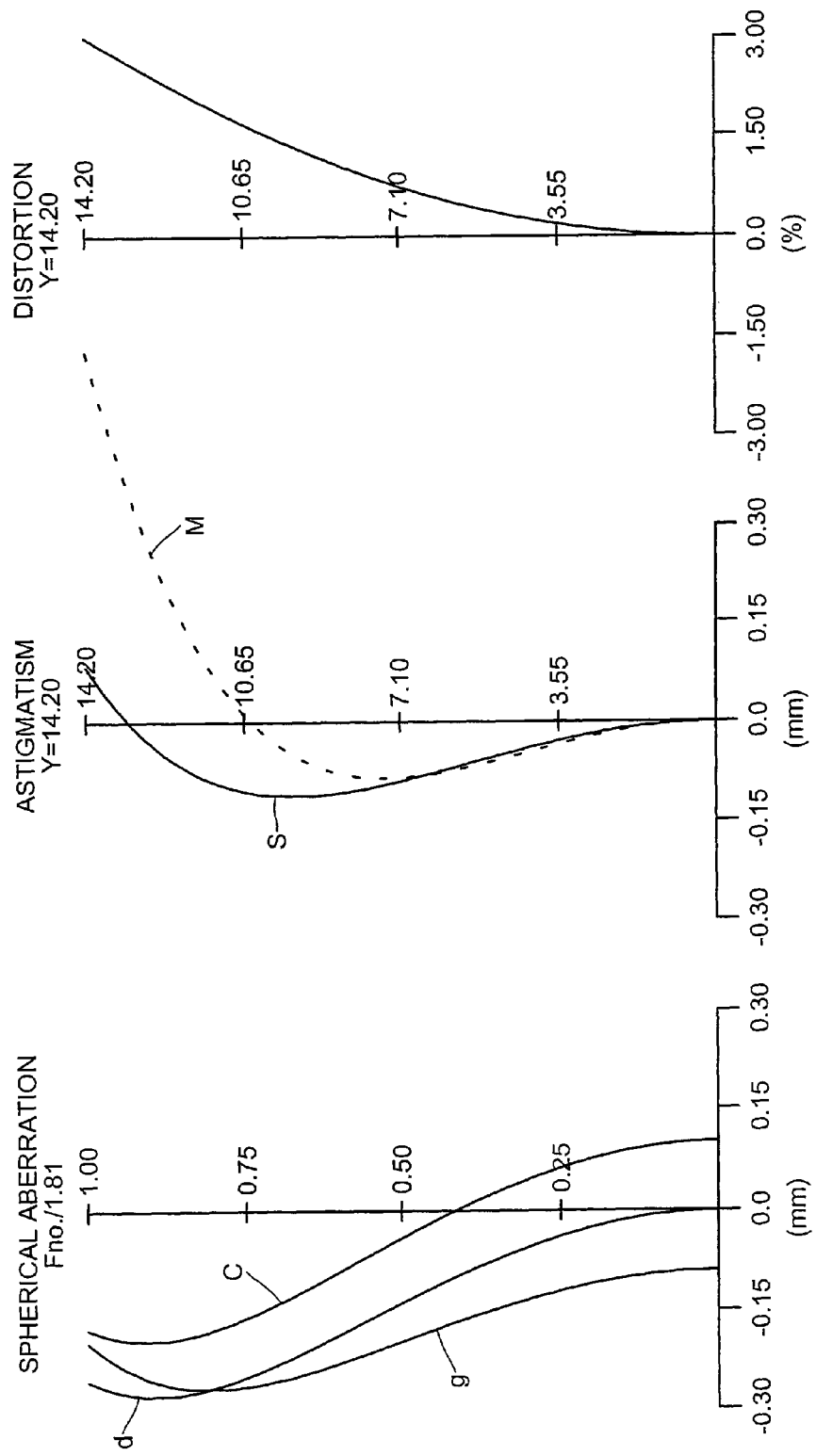
FIG. 4 is a diagram of various types of aberration occurring with focusing at the minimum object distance in the internal focus lens according to the first embodiment.

FIG. 2 is a diagram of various types of aberration occurring at infinity focus in the internal focus lens according to the first embodiment. FIG. 3 is a diagram of various types of aberration occurring with focusing at 0.025× magnification in the internal focus lens according to the first embodiment. FIG. 4 is a diagram of various types of aberration occurring with focusing at the minimum object distance in the internal focus lens according to the first embodiment. In the diagrams, g, d, and C represent wavelength aberration at g-line (λ=435.83 nm), at d-line (λ=587.56 nm), and at C-line (λ=656.28 nm), respectively. Furthermore, in the drawings, S and M shown with respect to astigmatism, respectively indicate aberration at the sagittal image plane and at the meridonal image plane.

Figure 5:
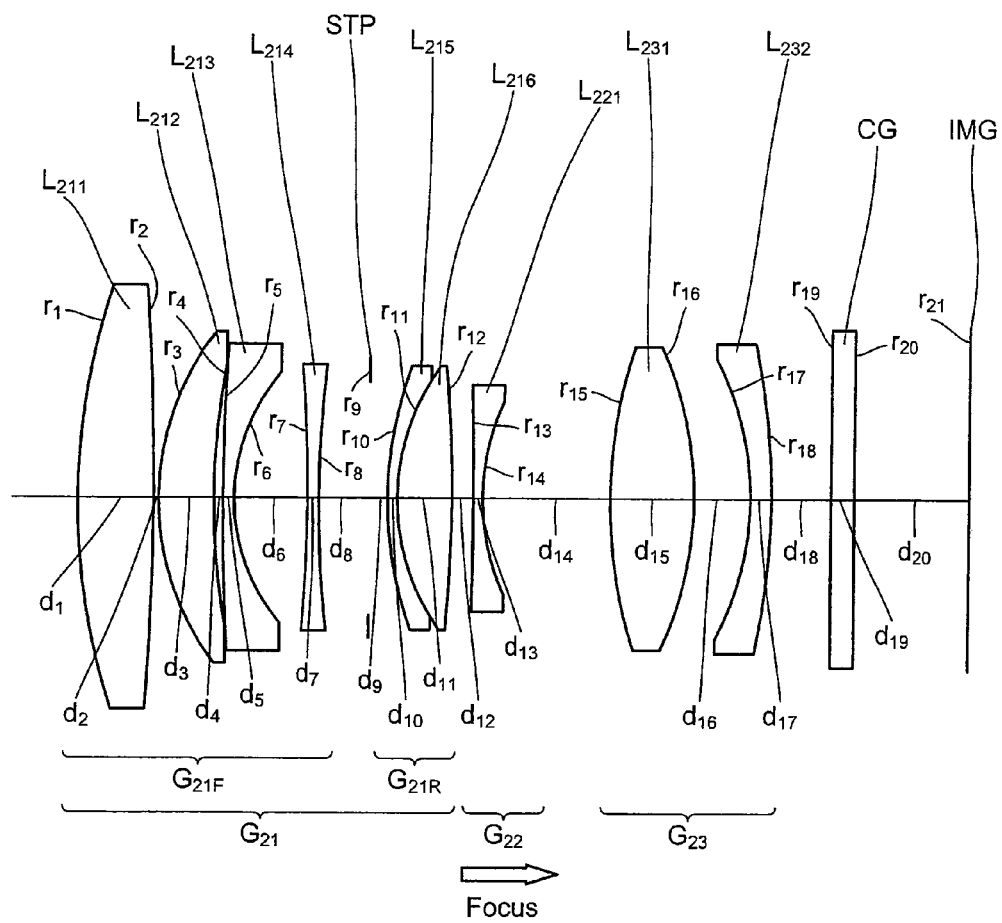
FIG. 5 is a cross sectional view (along an optical axis) of the internal focus lens according to a second embodiment.

FIG. 5 is a cross sectional view (along an optical axis) of the internal focus lens according to a second embodiment. The internal focus lens includes sequentially from the object side, a first lens group $G_{21}$ having a positive refractive power, a second lens group $G_{22}$ having a negative refractive power, and a third lens group $G_{23}$ having a positive refractive power. Between the third lens group $G_{23}$ and the imaging plane IMG, the cover glass CG is disposed. The cover glass CG is disposed as necessary and may be omitted when not necessary. At the imaging plane IMG, the light receiving surface of an imaging sensor such as a CCD, CMOS, etc. is disposed.

The first lens group $G_{21}$ includes sequentially from the object side, a front group $G_{21F}$ having a negative refractive power, the aperture stop STP prescribing a given aperture, and a rear group $G_{21R}$ having a positive refractive power. The front group $G_{21F}$ includes sequentially from the object side, a positive lens $L_{211}$, a positive lens $L_{212}$, a negative lens $L_{213}$, and a negative lens $L_{214}$. The rear group $G_{21R}$ includes sequentially from the object side, a negative lens $L_{215}$ and a positive lens $L_{216}$. The negative lens $L_{215}$ and the positive lens $L_{216}$ are cemented. The lens configuration of the first lens group $G_{21}$ is substantially symmetrical about the aperture stop STP. The first lens group $G_{21}$ is fixed and does not move during focusing.

The second lens group $G_{22}$ is configured by a negative lens $L_{221}$. The second lens group $G_{22}$ is moved along the optical axis, from the object side toward the imaging plane IMG, whereby focusing from infinity focus to focus at the minimum object distance is performed.

The third lens group $G_{23}$ includes sequentially from the object side, a positive lens $L_{231}$ and a negative lens $L_{232}$. The third lens group $G_{23}$ is also fixed and does not move during focusing.

Here, various values related to the internal focus lens according to the second embodiment are given.

(Lens Data)

| | | |
|---|---|---|
| $r_1$ = 56.3969 | | |
| $d_1$ = 6.2609 | $nd_1$ = 1.83481 | $vd_1$ = 42.72 |
| $r_2$ = −227.646 | | |
| $d_2$ = 0.4 | | |
| $r_3$ = 22.2275 | | |
| $d_3$ = 4.5373 | $nd_2$ = 1.83481 | $vd_2$ = 42.72 |
| $r_4$ = 61.9644 | | |
| $d_4$ = 0.8239 | | |
| $r_5$ = 213.9013 | | |
| $d_5$ = 0.9 | $nd_3$ = 1.72825 | $vd_3$ = 28.32 |
| $r_6$ = 15.7669 | | |
| $d_6$ = 6.2945 | | |
| $r_7$ = −108.362 | | |
| $d_7$ = 0.8 | $nd_4$ = 1.72825 | $vd_4$ = 28.32 |
| $r_8$ = 84.2155 | | |
| $d_8$ = 4.4348 | | |
| $r_9$ = ∞ (aperture stop) | | |
| $d_9$ = 1.5 | | |
| $r_{10}$ = 32.8654 | | |
| $d_{10}$ = 0.8 | $nd_5$ = 1.84666 | $vd_5$ = 23.78 |
| $r_{11}$ = 18.5472 | | |
| $d_{11}$ = 4.5781 | $nd_6$ = 1.91082 | $vd_6$ = 35.25 |
| $r_{12}$ = −110.767 | | |
| $d_{12}$ = D(12) (variable) | | |
| $r_{13}$ = −228.318 | | |
| $d_{13}$ = 0.7 | $nd_7$ = 1.603 | $vd_7$ = 65.44 |
| $r_{14}$ = 18.6759 | | |
| $d_{14}$ = D(14) (variable) | | |
| $r_{15}$ = 39.4179 | | |
| $d_{15}$ = 7 | $nd_8$ = 1.72916 | $vd_8$ = 54.67 |
| $r_{16}$ = −29.8753 | | |
| $d_{16}$ = 4.6748 | | |
| $r_{17}$ = −25.5175 | | |
| $d_{17}$ = 1.8 | $nd_9$ = 1.80809 | $vd_9$ = 22.76 |
| $r_{18}$ = −61.8081 | | |
| $d_{18}$ = 5 | | |
| $r_{19}$ = ∞ | | |
| $d_{19}$ = 2 | $nd_{10}$ = 1.5168 | $vd_{10}$ = 64.2 |
| $r_{20}$ = ∞ | | |
| $d_{20}$ = 9.8561 | | |
| $r_{21}$ = ∞ (imaging plane) | | |

-continued

| (Values for focusing states) | | | |
|---|---|---|---|
| | Infinity | 0.025x | Min. object dist. (0.141x) |
| D(12) | 1.804 | 2.598 | 6.351 |
| D(14) | 10.836 | 10.042 | 6.289 |
| image height(Y) | 14.20 | 14.20 | 14.20 | f (focal length of entire optical system) = 51.50
Fno = 1.84
ω(half-angle) = 15.42
minimum object distance = 0.450
f1(focal length of first lens group $G_{21}$) = 39.70
f2(focal length of second lens group $G_{22}$) = −28.60
f3(focal length of third lens group $G_{23}$) = 36.75
f3n(focal length of negative lens $L_{232}$) = −55.00
(Values related to conditional expression (1))
|f3|/f = 0.71
(Values related to conditional expression (2))
Fno × f1/f = 1.41
(Values related to conditional expression (3))
|f3n|/f = 1.07
(Values related to conditional expression (4))
|f2|/f = 0.56
(Values related to conditional expression (5))
nd(refractive index at d-line of second lens group $G_{22}$) = 1.603
(Values related to conditional expression (6))
vd(Abbe number at d-line of second lens group $G_{22}$) = 65.44

Figure 6:
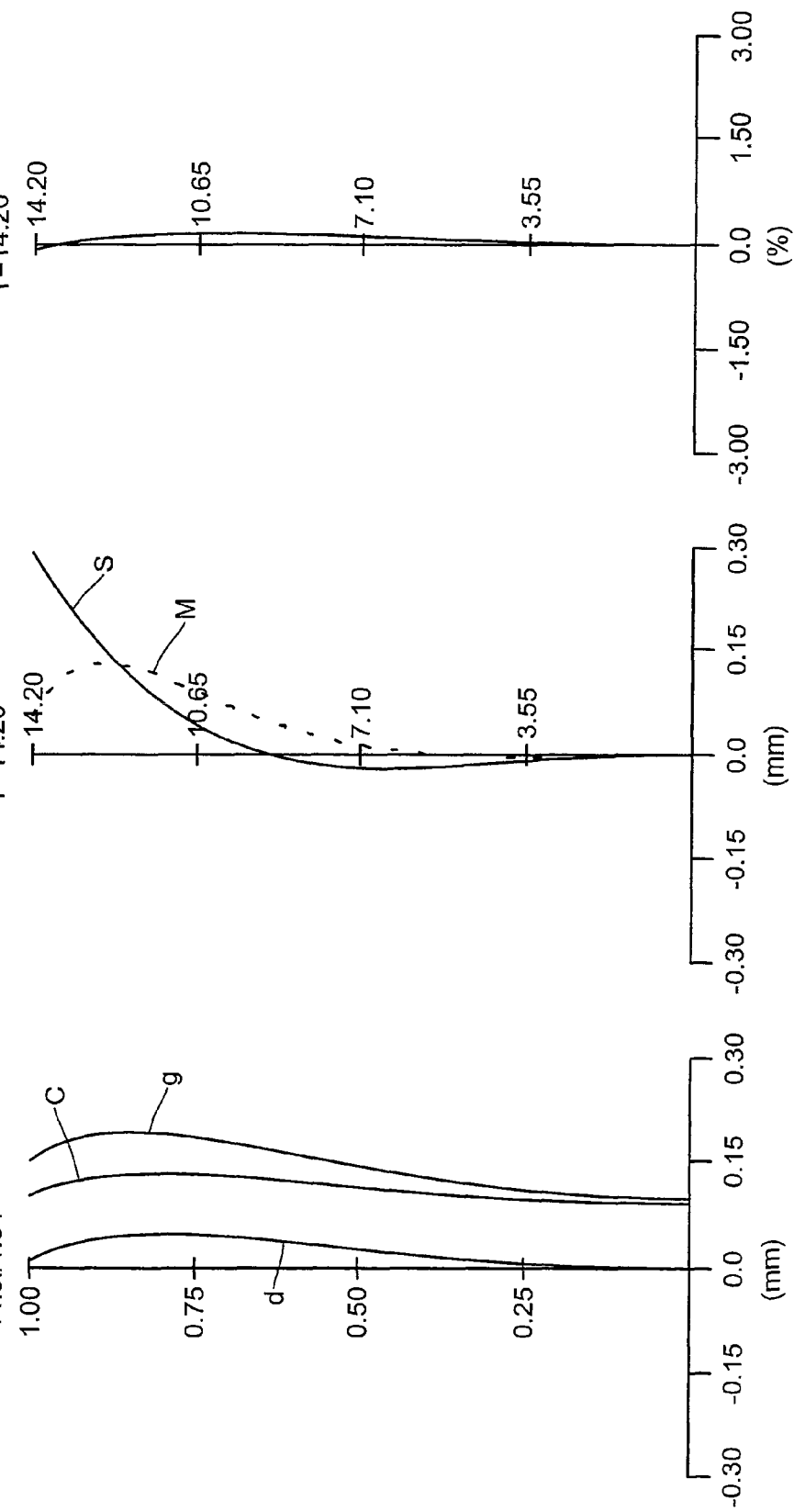
FIG. 6 is a diagram of various types of aberration occurring at infinity focus in the internal focus lens according to the second embodiment.
Figure 7:
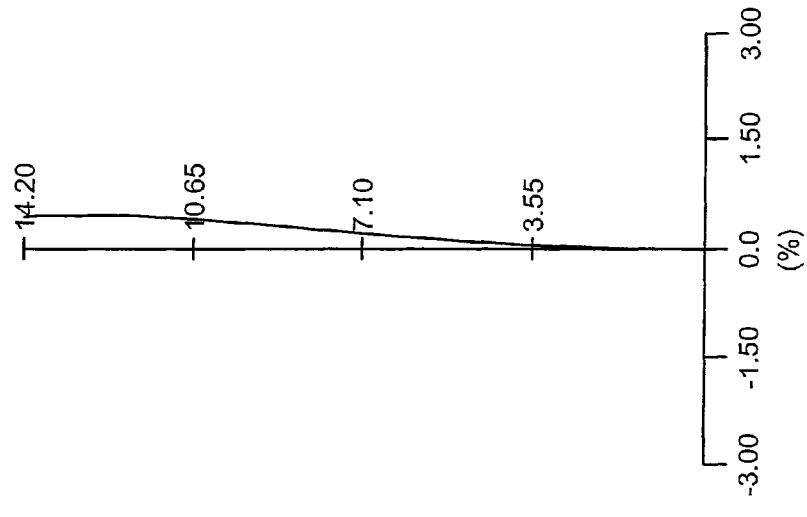
FIG. 7 is a diagram of various types of aberration occurring with focusing at 0.025× magnification in the internal focus lens according to the second embodiment.
Figure 8:
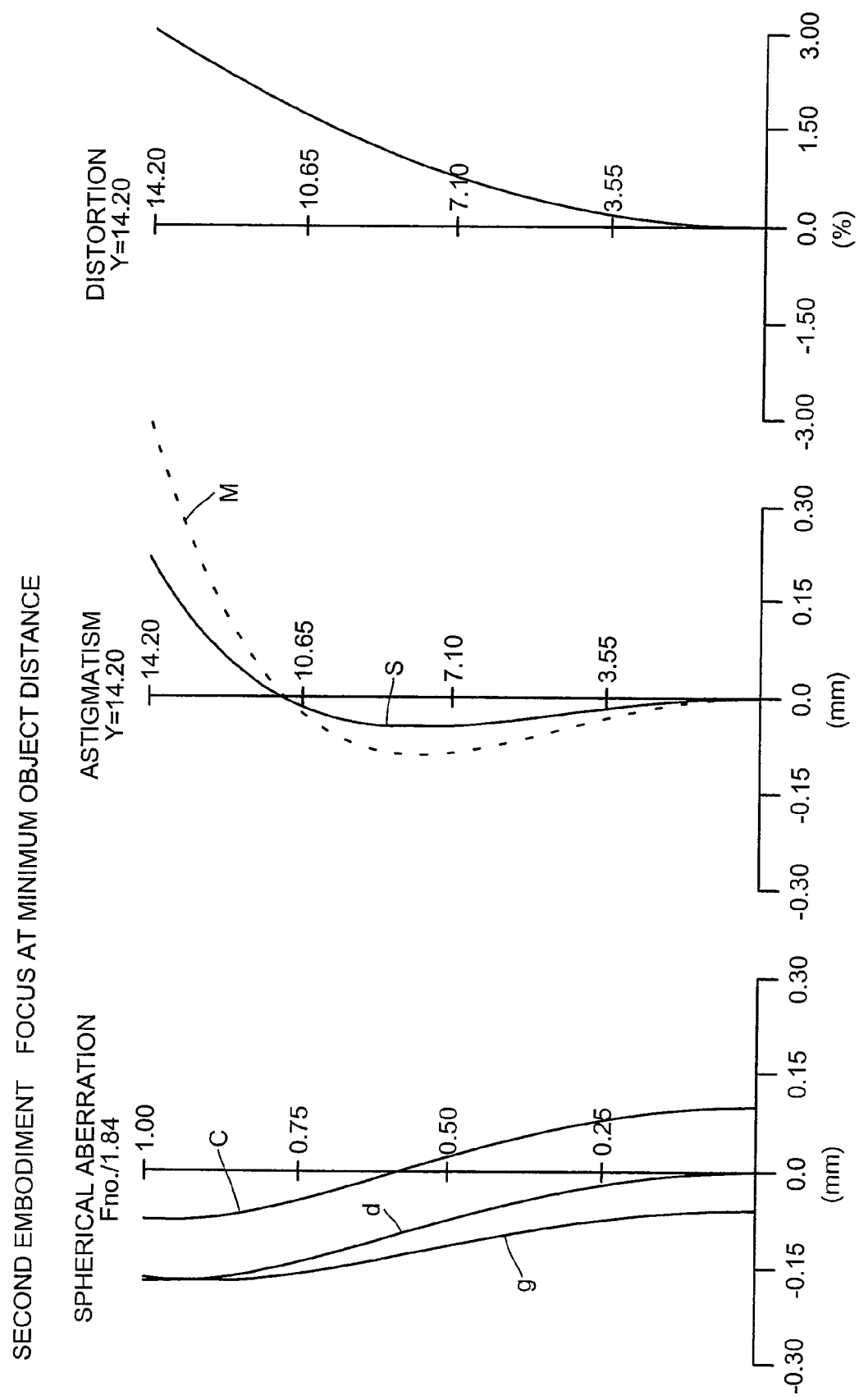
FIG. 8 is a diagram of various types of aberration occurring with focusing at the minimum object distance in the internal focus lens according to the second embodiment.

FIG. 6 is a diagram of various types of aberration occurring at infinity focus in the internal focus lens according to the second embodiment. FIG. 7 is a diagram of various types of aberration occurring with focusing at 0.025x magnification in the internal focus lens according to the second embodiment. FIG. 8 is a diagram of various types of aberration occurring with focusing at the minimum object distance in the internal focus lens according to the second embodiment. In the diagrams, g, d, and C represent wavelength aberration at g-line (λ=435.83 nm), at d-line (λ=587.56 nm), and at C-line (λ=656.28 nm), respectively. Furthermore, in the drawings, S and M shown with respect to astigmatism, respectively indicate aberration at the sagittal image plane and at the meridonal image plane.

Figure 9:
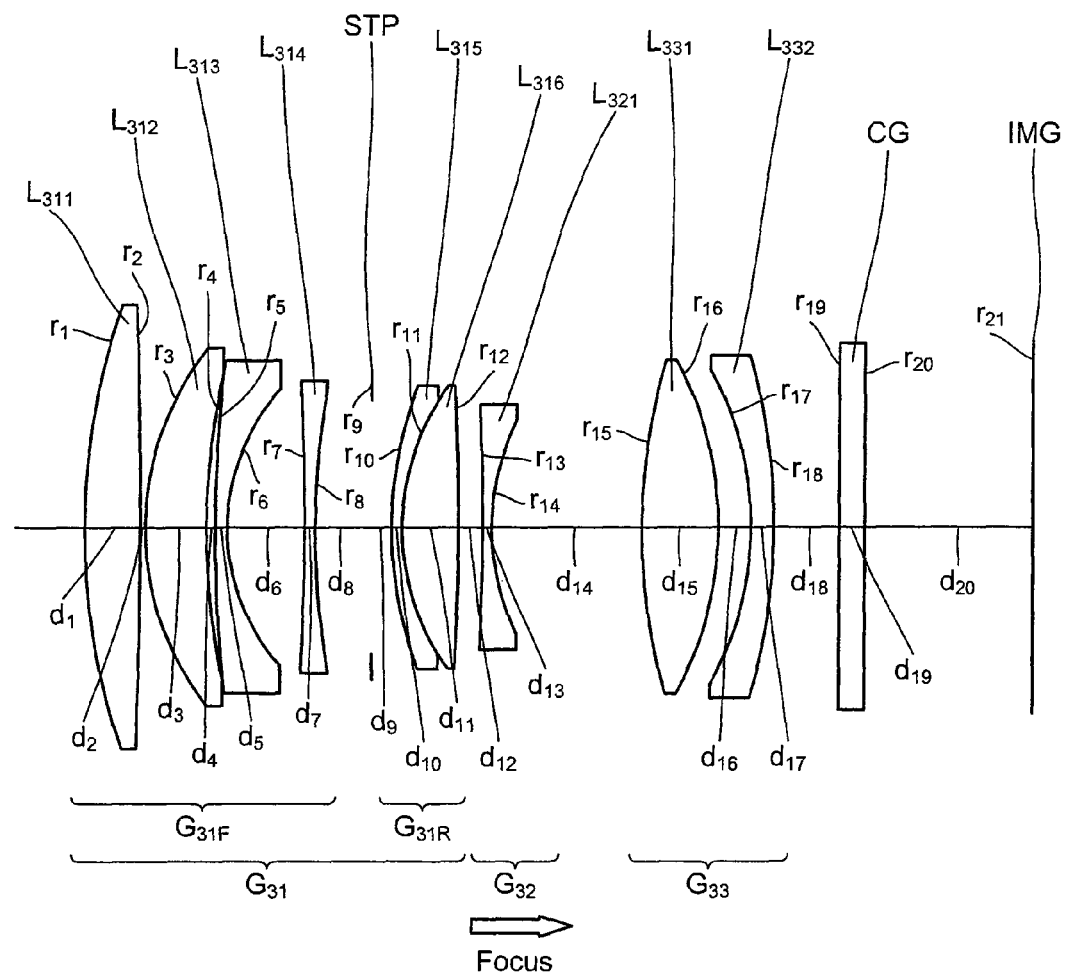
FIG. 9 is a cross sectional view (along an optical axis) of the internal focus lens according to a third embodiment.

FIG. 9 is a cross sectional view (along an optical axis) of the internal focus lens according to a third embodiment. The internal focus lens includes sequentially from the object side, a first lens group $G_{31}$ having a positive refractive power, a second lens group $G_{32}$ having a negative refractive power, and a third lens group $G_{33}$ having a positive refractive power. Between the third lens group $G_{33}$ and the imaging plane IMG, the cover glass CG is disposed. The cover glass CG is disposed as necessary and may be omitted when not necessary. At the imaging plane IMG, the light receiving surface of an imaging sensor such as a CCD, CMOS, etc. is disposed.

The first lens group $G_{31}$ includes sequentially from the object side, a front group $G_{31F}$ having a negative refractive power, the aperture stop STP prescribing a given aperture, and a rear group $G_{31R}$ having a positive refractive power. The front group $G_{31F}$ includes sequentially from the object side, a positive lens $L_{311}$, a positive lens $L_{312}$, a negative lens $L_{313}$, and a negative lens $L_{314}$. The rear group $G_{31R}$ includes sequentially from the object side, a negative lens $L_{315}$ and a positive lens $L_{316}$. The negative lens $L_{315}$ and the positive lens $L_{316}$ are cemented. The lens configuration of the first lens group $G_{31}$ is substantially symmetrical about the aperture stop STP. The first lens group $G_{31}$ is fixed and does not move during focusing.

The second lens group $G_{32}$ is configured by a negative lens $L_{321}$. The second lens group $G_{32}$ is moved along the optical axis, from the object side toward the imaging plane IMG, whereby focusing from infinity focus to focus at the minimum object distance is performed.

The third lens group $G_{33}$ includes sequentially from the object side, a positive lens $L_{331}$ and a negative lens $L_{332}$. The third lens group $G_{33}$ is also fixed and does not move during focusing.

Here, various values related to the internal focus lens according to the third embodiment are given.

| (Lens Data) | | | |
|---|---|---|---|
| $r_1$ = 50.8102 | | | |
| $d_1$ = 4.3090 | | $nd_1$ = 1.83481 | $vd_1$ = 42.72 |
| $r_2$ = −452.9370 | | | |
| $d_2$ = 0.4000 | | | |
| $r_3$ = 21.8756 | | | |
| $d_3$ = 4.7469 | | $nd_2$ = 1.83481 | $vd_2$ = 42.72 |
| $r_4$ = 55.4151 | | | |
| $d_4$ = 0.6764 | | | |
| $r_5$ = 115.5343 | | | |
| $d_5$ = 0.9000 | | $nd_3$ = 1.72825 | $vd_3$ = 28.32 |
| $r_6$ = 15.6000 | | | |
| $d_6$ = 5.9799 | | | |
| $r_7$ = −205.8400 | | | |
| $d_7$ = 0.8000 | | $nd_4$ = 1.72825 | $vd_4$ = 28.32 |
| $r_8$ = 62.0173 | | | |
| $d_8$ = 4.3755 | | | |
| $r_9$ = ∞ (aperture stop) | | | |
| $d_9$ = 1.5000 | | | |
| $r_{10}$ = 30.2706 | | | |
| $d_{10}$ = 0.8000 | | $nd_5$ = 1.84666 | $vd_5$ = 23.78 |
| $r_{11}$ = 18.0769 | | | |
| $d_{11}$ = 4.3873 | | $nd_6$ = 1.91082 | $vd_6$ = 35.25 |
| $r_{12}$ = −213.5900 | | | |
| $d_{12}$ = D(12) (variable) | | | |
| $r_{13}$ = −183.0600 | | | |
| $d_{13}$ = 0.7000 | | $nd_7$ = 1.603 | $vd_7$ = 65.44 |
| $r_{14}$ = 18.3813 | | | |
| $d_{14}$ = D(14) (variable) | | | |
| $r_{15}$ = 45.2360 | | | |
| $d_{15}$ = 5.9633 | | $nd_8$ = 1.72916 | $vd_8$ = 54.67 |
| $r_{16}$ = −26.4721 | | | |
| $d_{16}$ = 2.5000 | | | |
| $r_{17}$ = −24.6338 | | | |
| $d_{17}$ = 1.8000 | | $nd_9$ = 1.80809 | $vd_9$ = 22.76 |
| $r_{18}$ = −46.3537 | | | |
| $d_{18}$ = 5.0000 | | | |
| $r_{19}$ = ∞ | | | |
| $d_{19}$ = 2.0000 | | $nd_{10}$ = 1.5168 | $vd_{10}$ = 64.2 |
| $r_{20}$ = ∞ | | | |
| $d_{20}$ = 13.0843 | | | |
| $r_{21}$ = ∞ (imaginig plane) | | | |

| (Values for focusing states) | | | |
|---|---|---|---|
| | Infinity | 0.025x | Min. object dist. (0.141x) |
| D(12) | 1.848 | 2.630 | 6.351 |
| D(14) | 11.703 | 10.921 | 7.200 |
| image height(Y) | 14.20 | 14.20 | 14.20 | f (focal length of entire optical system) = 51.50
Fno = 1.82
ω(half-angle) = 15.47
minimum object distance = 0.450
f1(focal length of first lens group $G_{31}$) = 39.55
f2(focal length of second lens group $G_{32}$) = −27.67
f3(focal length of third lens group $G_{33}$) = 34.51
f3n(focal length of negative lens $L_{332}$) = −67.56
(Values related to conditional expression (1))
|f3|/f = 0.67
(Values related to conditional expression (2))
Fno × f1/f = 1.40
(Values related to conditional expression (3))
|f3n|/f = 1.31
(Values related to conditional expression (4))
|f2|/f = 0.54
(Values related to conditional expression (5))
nd(refractive index at d-line of second lens group $G_{32}$) = 1.603
(Values related to conditional expression (6))
vd(Abbe number at d-line of second lens group $G_{32}$) = 65.44

Figure 10:
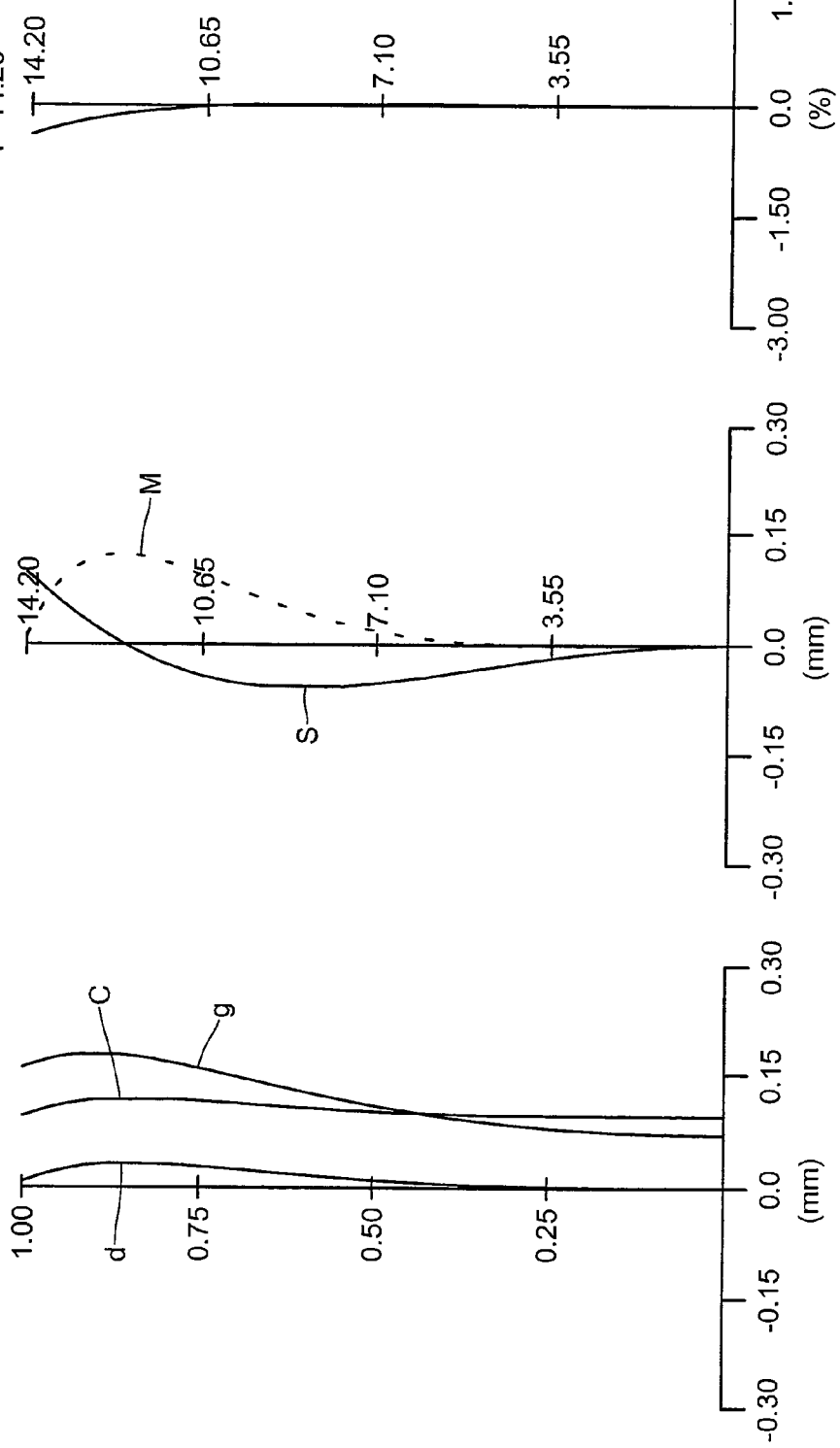
FIG. 10 is a diagram of various types of aberration occurring at infinity focus in the internal focus lens according to the third embodiment.
Figure 11:
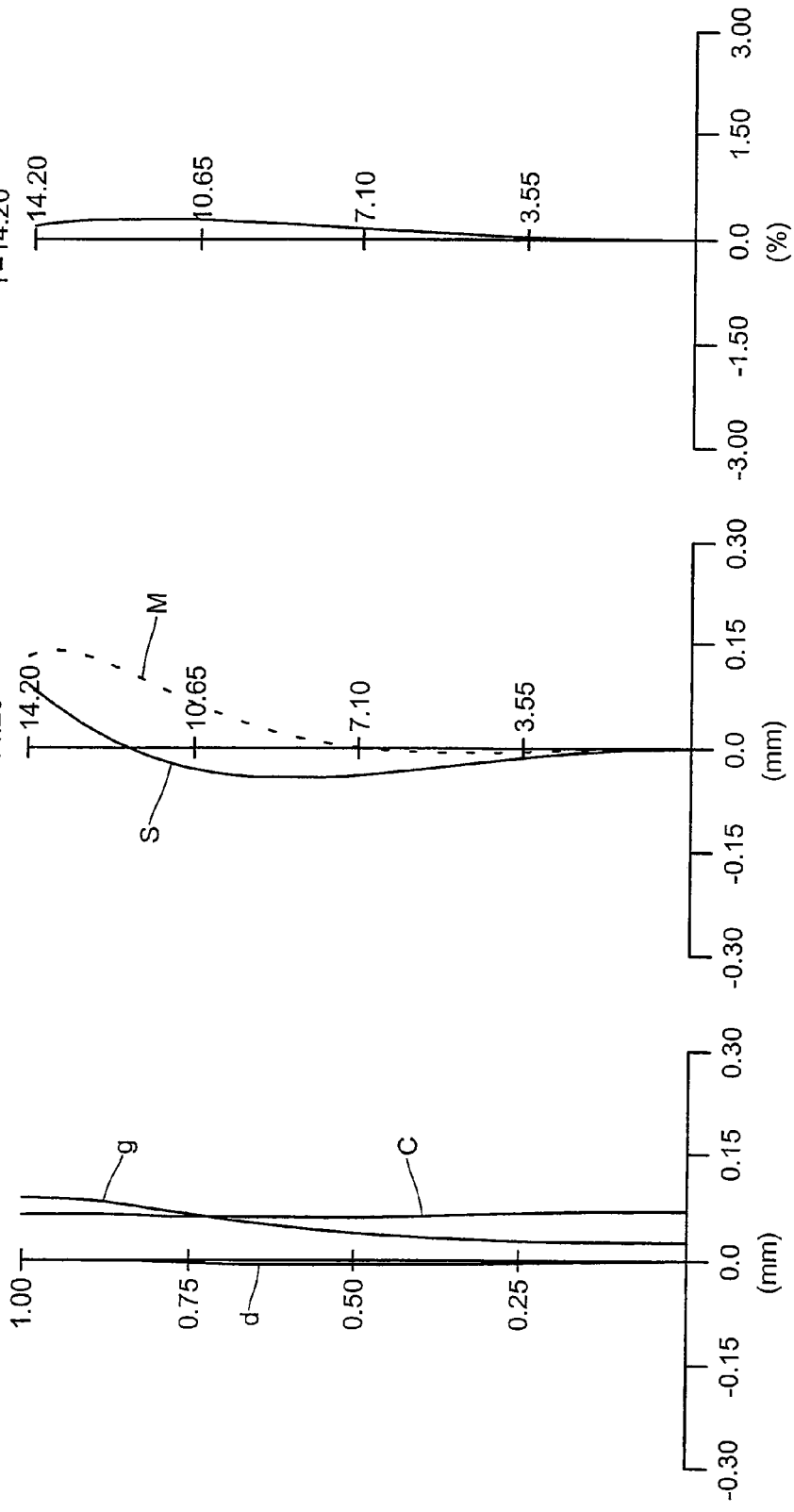
FIG. 11 is a diagram of various types of aberration occurring with focusing at 0.025× magnification in the internal focus lens according to the third embodiment.
Figure 12:
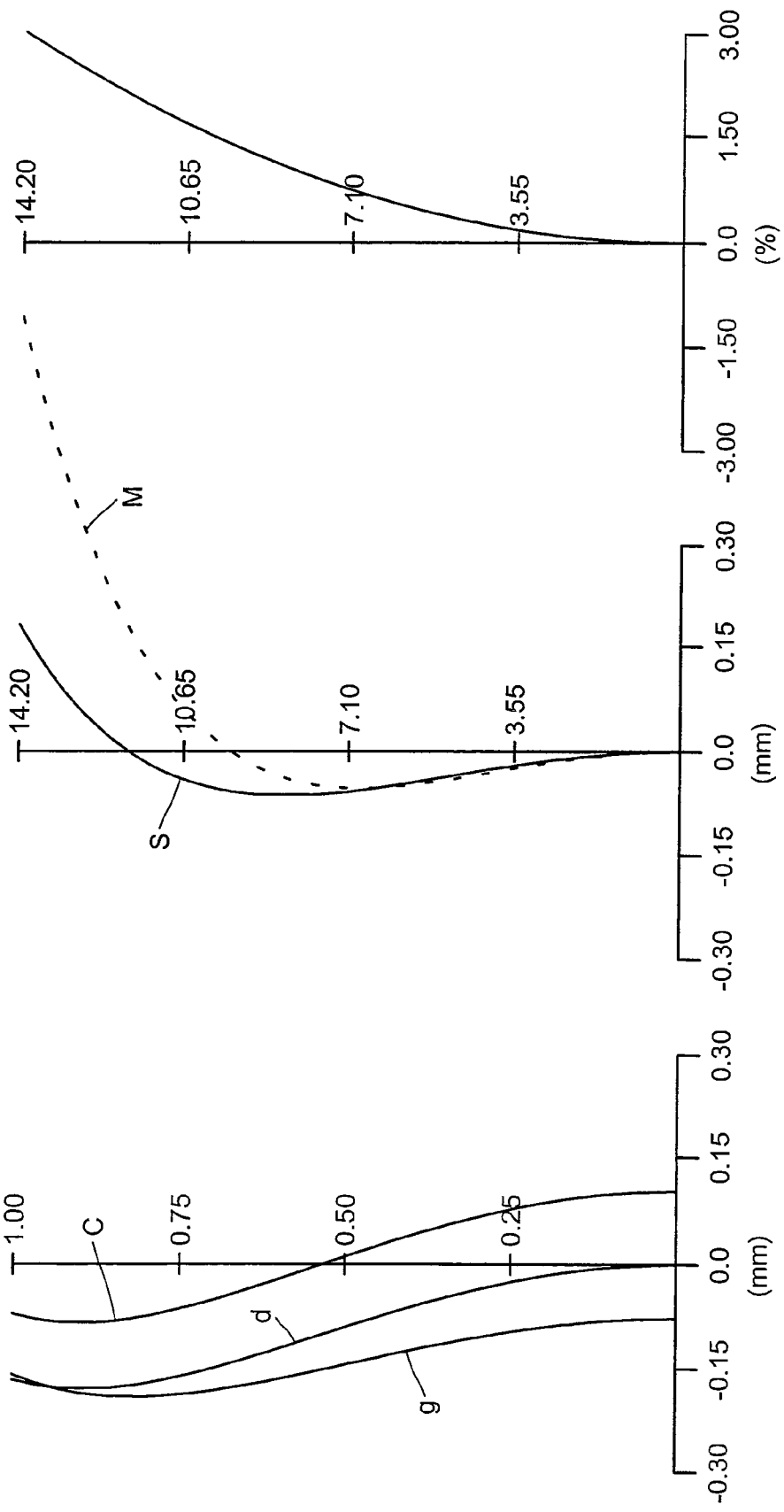
FIG. 12 is a diagram of various types of aberration occurring with focusing at the minimum object distance in the internal focus lens according to the third embodiment.

FIG. 10 is a diagram of various types of aberration occurring at infinity focus in the internal focus lens according to the third embodiment. FIG. 11 is a diagram of various types of aberration occurring with focusing at 0.025× magnification in the internal focus lens according to the third embodiment. FIG. 12 is a diagram of various types of aberration occurring with focusing at the minimum object distance in the internal focus lens according to the third embodiment. In the diagrams, g, d, and C represent wavelength aberration at g-line (λ=435.83 nm), at d-line (λ=587.56 nm), and at C-line (λ=656.28 nm), respectively. Furthermore, in the drawings, S and M shown with respect to astigmatism, respectively indicate aberration at the sagittal image plane and at the meridonal image plane.

Figure 13:
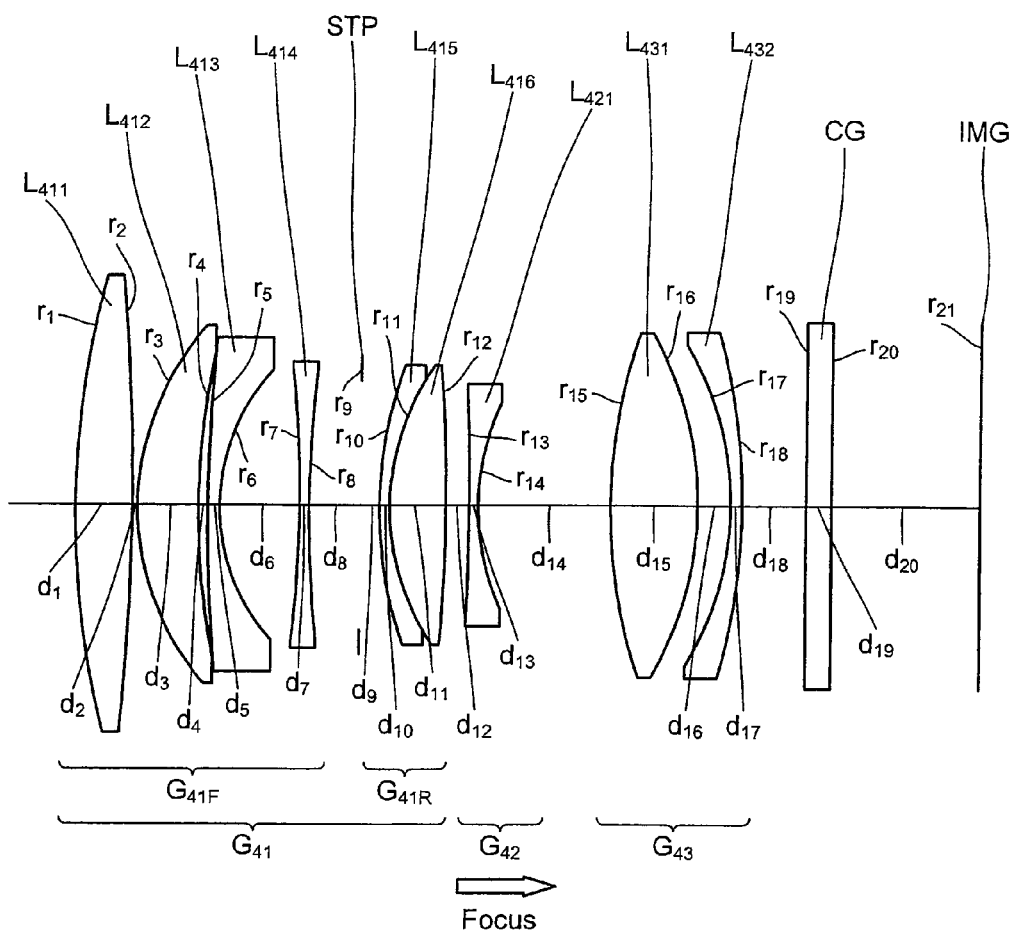
FIG. 13 is a cross sectional view (along an optical axis) of the internal focus lens according to a fourth embodiment.

FIG. 13 is a cross sectional view (along an optical axis) of the internal focus lens according to a fourth embodiment. The internal focus lens includes sequentially from the object side, a first lens group $G_{41}$ having a positive refractive power, a second lens group $G_{42}$ having a negative refractive power, and a third lens group $G_{43}$ having a positive refractive power. Between the third lens group $G_{43}$ and the imaging plane IMG, the cover glass CG is disposed. The cover glass CG is disposed as necessary and may be omitted when not necessary. At the imaging plane IMG, the light receiving surface of an imaging sensor such as a CCD, CMOS, etc. is disposed.

The first lens group $G_{41}$ includes sequentially from the object side, a front group $G_{41F}$ having a negative refractive power, the aperture stop STP prescribing a given aperture, and a rear group $G_{41R}$ having a positive refractive power. The front group $G_{41F}$, includes sequentially from the object side, a positive lens $L_{411}$, a positive lens $L_{412}$, a negative lens $L_{413}$, and a negative lens $L_{414}$. The rear group $G_{41R}$ includes sequentially from the object side, a negative lens $L_{415}$ and a positive lens $L_{416}$. The negative lens $L_{415}$ and the positive lens $L_{416}$ are cemented. The lens configuration of the first lens group $G_{41}$ is substantially symmetrical about the aperture stop STP. The first lens group $G_{41}$ is fixed and does not move during focusing.

The second lens group $G_{42}$ is configured by a negative lens $L_{421}$. The second lens group $G_{42}$ is moved along the optical axis, from the object side toward the imaging plane IMG, whereby focusing from infinity focus to focus at the minimum object distance is performed.

The third lens group $G_{43}$ includes sequentially from the object side, a positive lens $L_{431}$ and a negative lens $L_{432}$. The third lens group $G_{43}$ is also fixed and does not move during focusing.

Here, various values related to the internal focus lens according to the fourth embodiment are given.

(Lens Data)

| | | |
|---|---|---|
| $r_1$ = 68.2826 | | |
| $d_1$ = 4.4640 | $nd_1$ = 1.83481 | $vd_1$ = 42.72 |
| $r_2$ = −192.2554 | | |
| $d_2$ = 0.4000 | | |
| $r_3$ = 20.9820 | | |
| $d_3$ = 4.7829 | $nd_2$ = 1.83481 | $vd_2$ = 42.72 |
| $r_4$ = 61.5185 | | |
| $d_4$ = 0.7040 | | |
| $r_5$ = 145.3055 | | |
| $d_5$ = 0.9000 | $nd_3$ = 1.72825 | $vd_3$ = 28.32 |
| $r_6$ = 15.3594 | | |
| $d_6$ = 6.3750 | | |
| $r_7$ = −98.5429 | | |
| $d_7$ = 0.8000 | $nd_4$ = 1.72825 | $vd_4$ = 28.32 |
| $r_8$ = 93.9972 | | |

-continued

| | | |
|---|---|---|
| $d_8$ = 4.0803 | | |
| $r_9$ = ∞ (aperture stop) | | |
| $d_9$ = 1.5000 | | |
| $r_{10}$ = 32.4300 | | |
| $d_{10}$ = 0.8000 | $nd_5$ = 1.84666 | $vd_5$ = 23.78 |
| $r_{11}$ = 19.1853 | | |
| $d_{11}$ = 4.4080 | $nd_6$ = 1.91082 | $vd_6$ = 35.25 |
| $r_{12}$ = −127.8255 | | |
| $d_{12}$ = D(12) (variable) | | |
| $r_{13}$ = −224.6075 | | |
| $d_{13}$ = 0.7000 | $nd_7$ = 1.603 | $vd_7$ = 65.44 |
| $r_{14}$ = 18.9466 | | |
| $d_{14}$ = D(14) (variable) | | |
| $r_{15}$ = 40.7832 | | |
| $d_{15}$ = 6.86337 | $nd_8$ = 1.72916 | $vd_8$ = 54.67 |
| $r_{16}$ = −26.8509 | | |
| $d_{16}$ = 2.5703 | | |
| $r_{17}$ = −24.1492 | | |
| $d_{17}$ = 0.9500 | $nd_9$ = 1.80809 | $vd_9$ = 22.76 |
| $r_{18}$ = −47.7157 | | |
| $d_{18}$ = 5.0000 | | |
| $r_{19}$ = ∞ | | |
| $d_{19}$ = 2.0000 | $nd_{10}$ = 1.5168 | $vd_{10}$ = 64.2 |
| $r_{20}$ = ∞ | | |
| $d_{20}$ = 11.8133 | | |
| $r_{21}$ = ∞ (imaging plane) | | |

(Values for focusing states)

| | Infinity | 0.025x | Min. object dist. (0.131x) |
|---|---|---|---|
| D(12) | 1.812 | 2.644 | 6.257 |
| D(14) | 10.432 | 9.600 | 5.987 |
| image height(Y) | 14.20 | 14.20 | 14.20 | f (focal length of entire optical system) = 48.24
Fno = 1.73
ω(half-angle) = 16.47
minimum object distance = 0.450
f1(focal length of first lens group $G_{41}$) = 39.23
f2(focal length of second lens group $G_{42}$) = −28.94
f3(focal length of third lens group $G_{43}$) = 33.96
f3n(focal length of negative lens $L_{432}$) = −61.62
(Values related to conditional expression (1))
|f3|/f = 0.70
(Values related to conditional expression (2))
Fno × f1/f = 1.41
(Values related to conditional expression (3))
|f3n|/f = 1.28
(Values related to conditional expression (4))
|f2|/f = 0.60
(Values related to conditional expression (5))
nd(refractive index at d-line of second lens group $G_{42}$) = 1.603
(Values related to conditional expression (6))
vd(Abbe number at d-line of second lens group $G_{42}$) = 65.44

Figure 14:
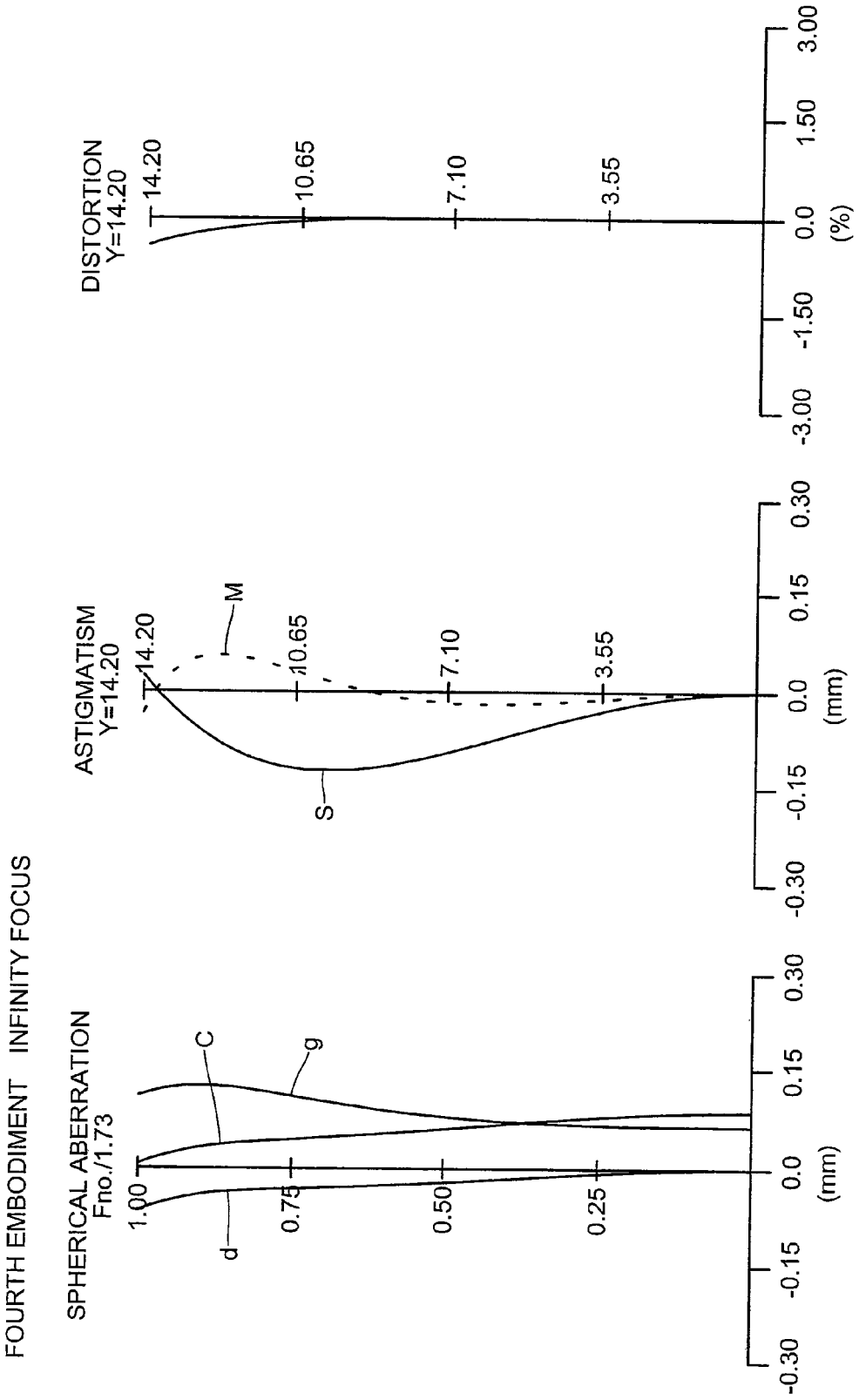
FIG. 14 is a diagram of various types of aberration occurring at infinity focus in the internal focus lens according to the fourth embodiment.
Figure 15:
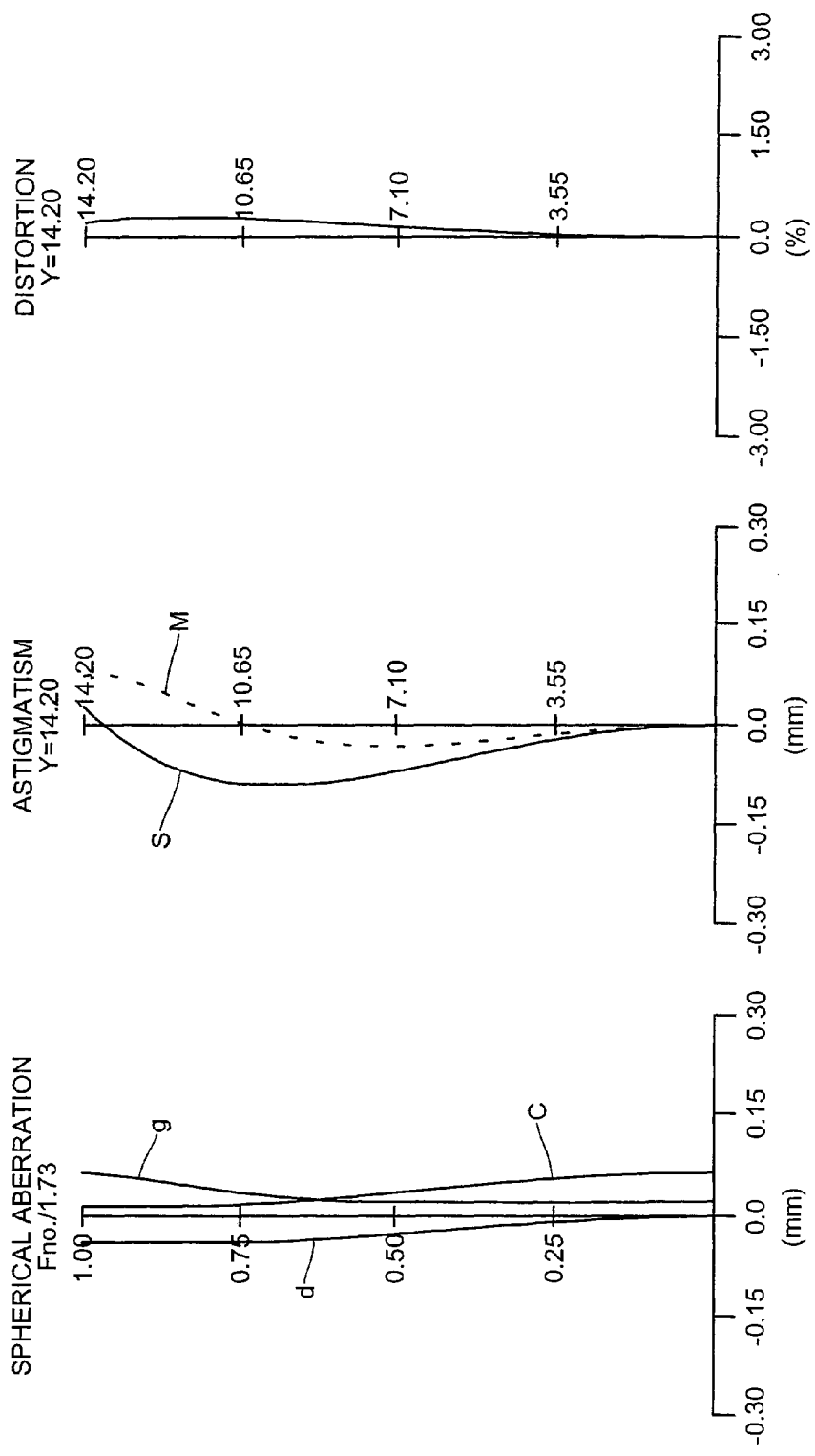
FIG. 15 is a diagram of various types of aberration occurring with focusing at 0.025× magnification in the internal focus lens according to the fourth embodiment.
Figure 16:
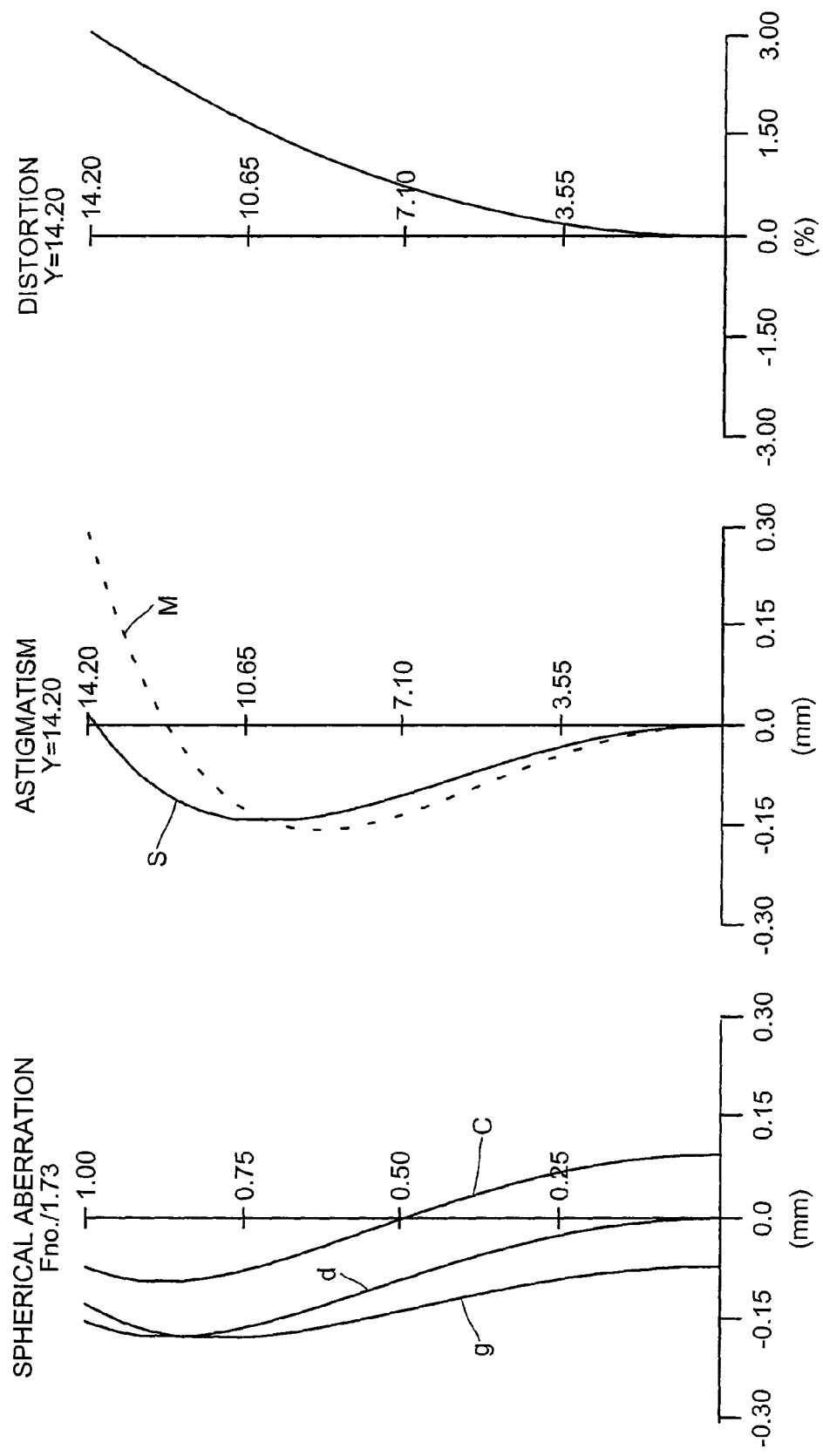
FIG. 16 is a diagram of various types of aberration occurring with focusing at the minimum object distance in the internal focus lens according to the fourth embodiment.

FIG. 14 is a diagram of various types of aberration occurring at infinity focus in the internal focus lens according to the fourth embodiment. FIG. 15 is a diagram of various types of aberration occurring with focusing at 0.025× magnification in the internal focus lens according to the fourth embodiment. FIG. 16 is a diagram of various types of aberration occurring with focusing at the minimum object distance in the internal focus lens according to the fourth embodiment. In the diagrams, g, d, and C represent wavelength aberration at g-line (λ=435.83 nm), at d-line (λ=587.56 nm), and at C-line (λ=656.28 nm), respectively. Furthermore, in the drawings, S and M shown with respect to astigmatism, respectively indicate aberration at the sagittal image plane and at the meridonal image plane.

Figure 17:
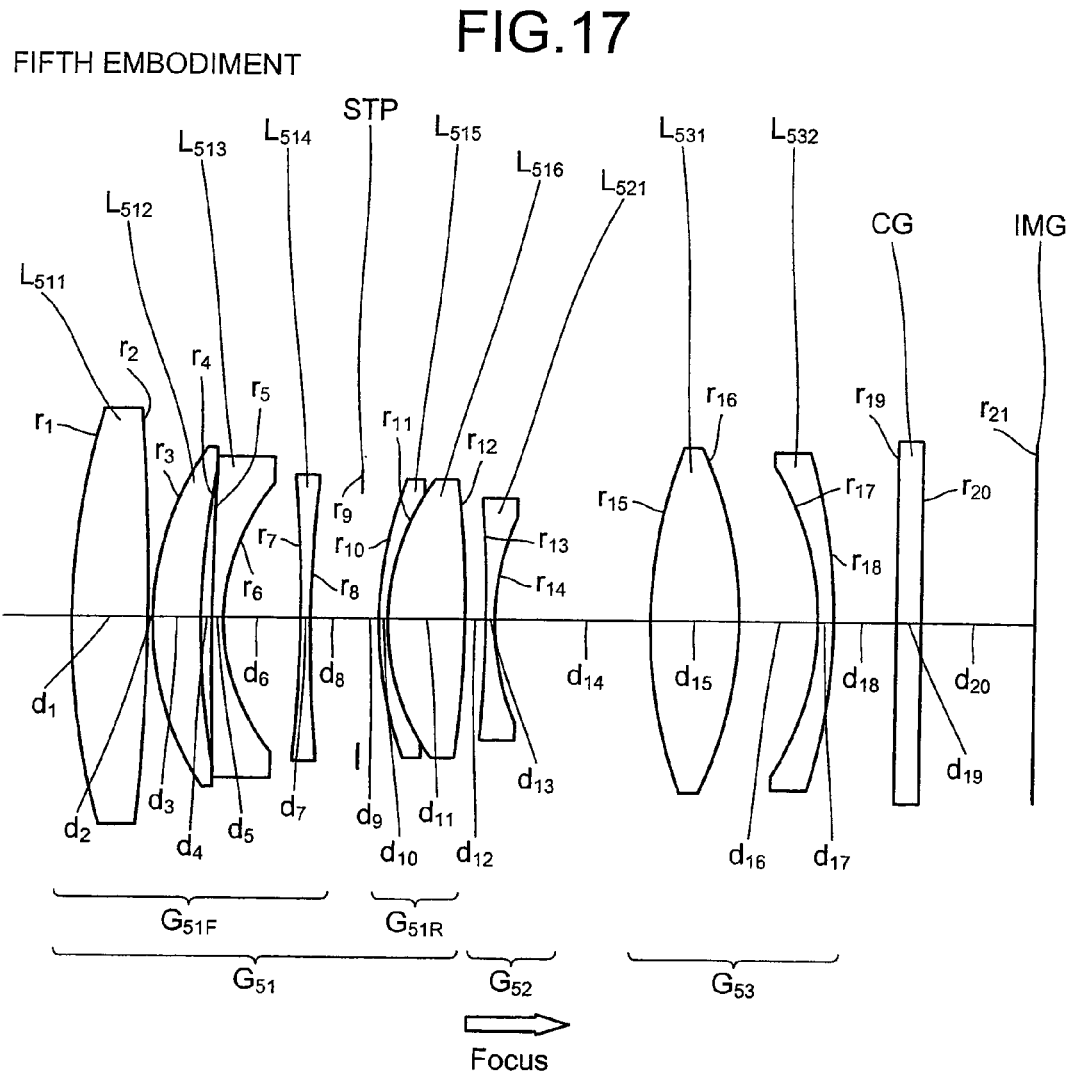
FIG. 17 is a cross sectional view (along an optical axis) of the internal focus lens according to a fifth embodiment.

FIG. 17 is a cross sectional view (along an optical axis) of the internal focus lens according to a fifth embodiment. The internal focus lens includes sequentially from the object side, a first lens group $G_{51}$ having a positive refractive power, a second lens group $G_{52}$ having a negative refractive power, and a third lens group $G_{53}$ having a positive refractive power.

Between the third lens group $G_{53}$ and the imaging plane IMG, the cover glass CG is disposed. The cover glass CG is disposed as necessary and may be omitted when not necessary. At the imaging plane IMG, the light receiving surface of an imaging sensor such as a CCD, CMOS, etc. is disposed.

The first lens group $G_{51}$ includes sequentially from the object side, a front group $G_{51F}$ having a negative refractive power, the aperture stop STP prescribing a given aperture, and a rear group $G_{51R}$ having a positive refractive power. The front group $G_{51F}$ includes sequentially from the object side, a positive lens $L_{511}$, a positive lens $L_{512}$, a negative lens $L_{513}$, and a negative lens $L_{514}$. The rear group $G_{51R}$ includes sequentially from the object side, a negative lens $L_{515}$ and a positive lens $L_{516}$. The negative lens $L_{515}$ and the positive lens $L_{516}$ are cemented. The lens configuration of the first lens group $G_{51}$ is substantially symmetrical about the aperture stop STP. The first lens group $G_{51}$ is fixed and does not move during focusing.

The second lens group $G_{52}$ is configured by a negative lens $L_{521}$. The second lens group $G_{52}$ is moved along the optical axis, from the object side toward the imaging plane IMG, whereby focusing from infinity focus to focus at the minimum object distance is performed.

The third lens group $G_{53}$ includes sequentially from the object side, a positive lens $L_{531}$ and a negative lens $L_{532}$. The third lens group $G_{53}$ is also fixed and does not move during focusing.

Here, various values related to the internal focus lens according to the fifth embodiment are given.

(Lens Data)

| | | |
|---|---|---|
| $r_1 = 58.046$ | | |
| $d_1 = 6.110$ | $nd_1 = 1.83481$ | $vd_1 = 42.72$ |
| $r_2 = -186.955$ | | |
| $d_2 = 0.400$ | | |
| $r_3 = 23.827$ | | |
| $d_3 = 3.800$ | $nd_2 = 1.91082$ | $vd_2 = 35.25$ |
| $r_4 = 63.373$ | | |
| $d_4 = 0.869$ | | |
| $r_5 = 279.970$ | | |
| $d_5 = 0.900$ | $nd_3 = 1.72825$ | $vd_3 = 28.32$ |
| $r_6 = 16.451$ | | |
| $d_6 = 6.076$ | | |
| $r_7 = -109.125$ | | |
| $d_7 = 0.800$ | $nd_4 = 1.8061$ | $vd_4 = 33.27$ |
| $r_8 = 109.615$ | | |
| $d_8 = 4.012$ | | |
| $r_9 = \infty$ (aperture stop) | | |
| $d_9 = 1.500$ | | |
| $r_{10} = 30.286$ | | |
| $d_{10} = 0.700$ | $nd_5 = 1.84666$ | $vd_5 = 23.78$ |
| $r_{11} = 18.621$ | | |
| $d_{11} = 6.198$ | $nd_6 = 1.83481$ | $vd_6 = 42.72$ |
| $r_{12} = -85.512$ | | |
| $d_{12} = D(12)$ (variable) | | |
| $r_{13} = -108.934$ | | |
| $d_{13} = 0.700$ | $nd_7 = 1.62041$ | $vd_7 = 60.34$ |
| $r_{14} = 20.396$ | | |
| $d_{14} = D(14)$ (variable) | | |
| $r_{15} = 38.631$ | | |
| $d_{15} = 7.000$ | $nd_8 = 1.72916$ | $vd_8 = 54.67$ |
| $r_{16} = -31.774$ | | |
| $d_{16} = 6.327$ | | |
| $r_{17} = -22.412$ | | |
| $d_{17} = 1.269$ | $nd_9 = 1.80518$ | $vd_9 = 25.46$ |
| $r_{18} = -45.176$ | | |
| $d_{18} = 5.000$ | | |
| $r_{19} = \infty$ | | |
| $d_{19} = 2.000$ | $nd_{10} = 1.5168$ | $vd_{10} = 64.2$ |
| $r_{20} = \infty$ | | |
| $d_{20} = 9.150$ | | |
| $r_{21} = \infty$ (imaging plane) | | |

(Values for focusing states)

| | Infinity | 0.025x | Min. object dist. (0.143x) |
|---|---|---|---|
| D(12) | 1.697 | 2.449 | 6.044 |
| D(14) | 12.490 | 11.738 | 8.143 |
| image height(Y) | 14.20 | 14.20 | 14.20 | f (focal length of entire optical system) = 51.50
Fno = 1.86
ω(half-angle) = 15.32
minimum object distance = 0.450
f1(focal length of first lens group $G_{51}$) = 39.05
f2(focal length of second lens group $G_{52}$) = −27.63
f3(focal length of third lens group $G_{53}$) = 36.05
f3n(focal length of negative lens $L_{532}$) = −56.65
(Values related to conditional expression (1))
|f3|/f = 0.70
(Values related to conditional expression (2))
Fno × f1/f = 1.41
(Values related to conditional expression (3))
|f3n|/f = 1.10
(Values related to conditional expression (4))
|f2|/f = 0.54
(Values related to conditional expression (5))
nd(refractive index at d-line of second lens group $G_{52}$) = 1.62041
(Values related to conditional expression (6))
vd(Abbe number at d-line of second lens group $G_{52}$) = 60.34

Figure 18:
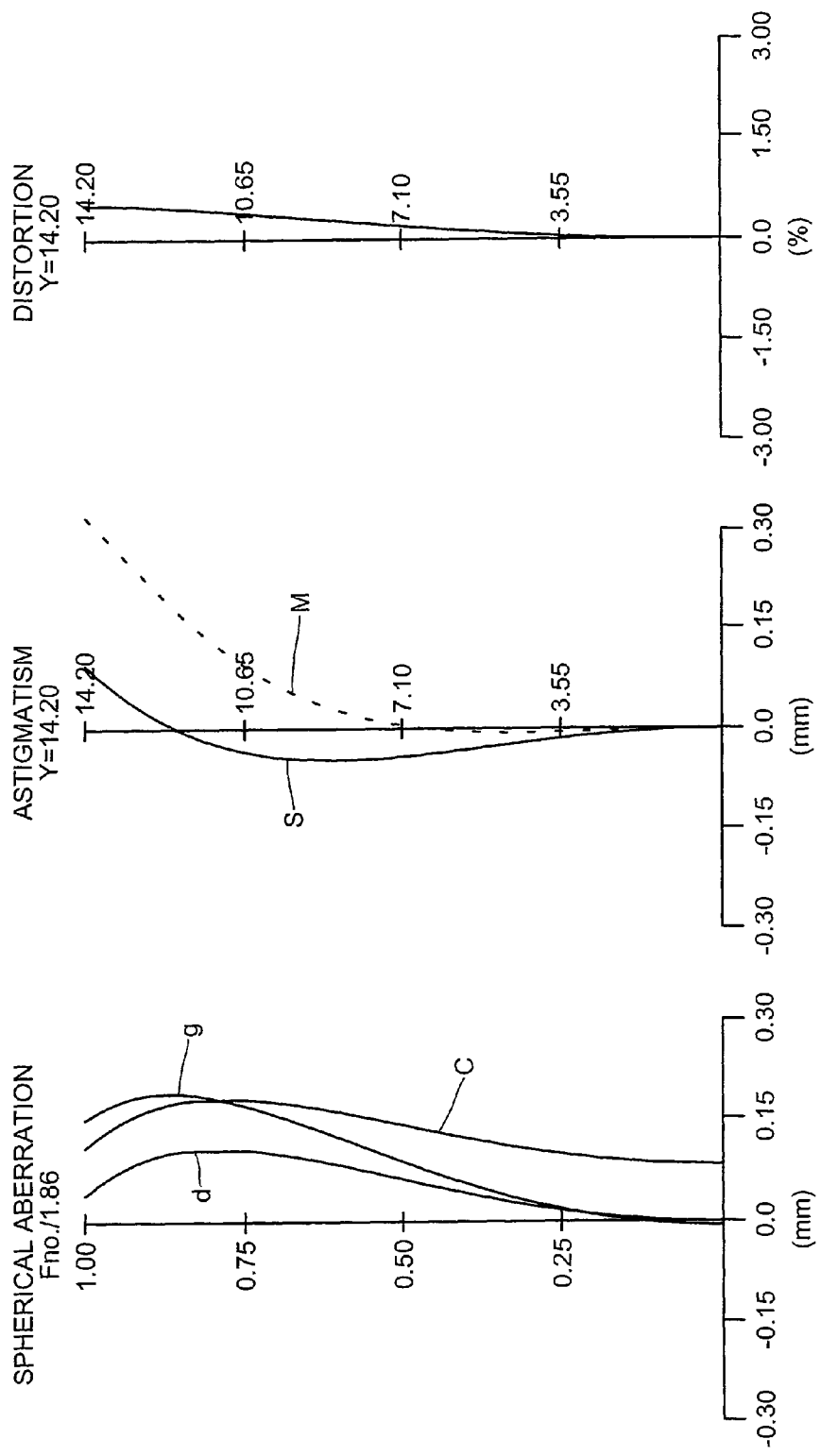
FIG. 18 is a diagram of various types of aberration occurring at infinity focus in the internal focus lens according to the fifth embodiment.
Figure 19:
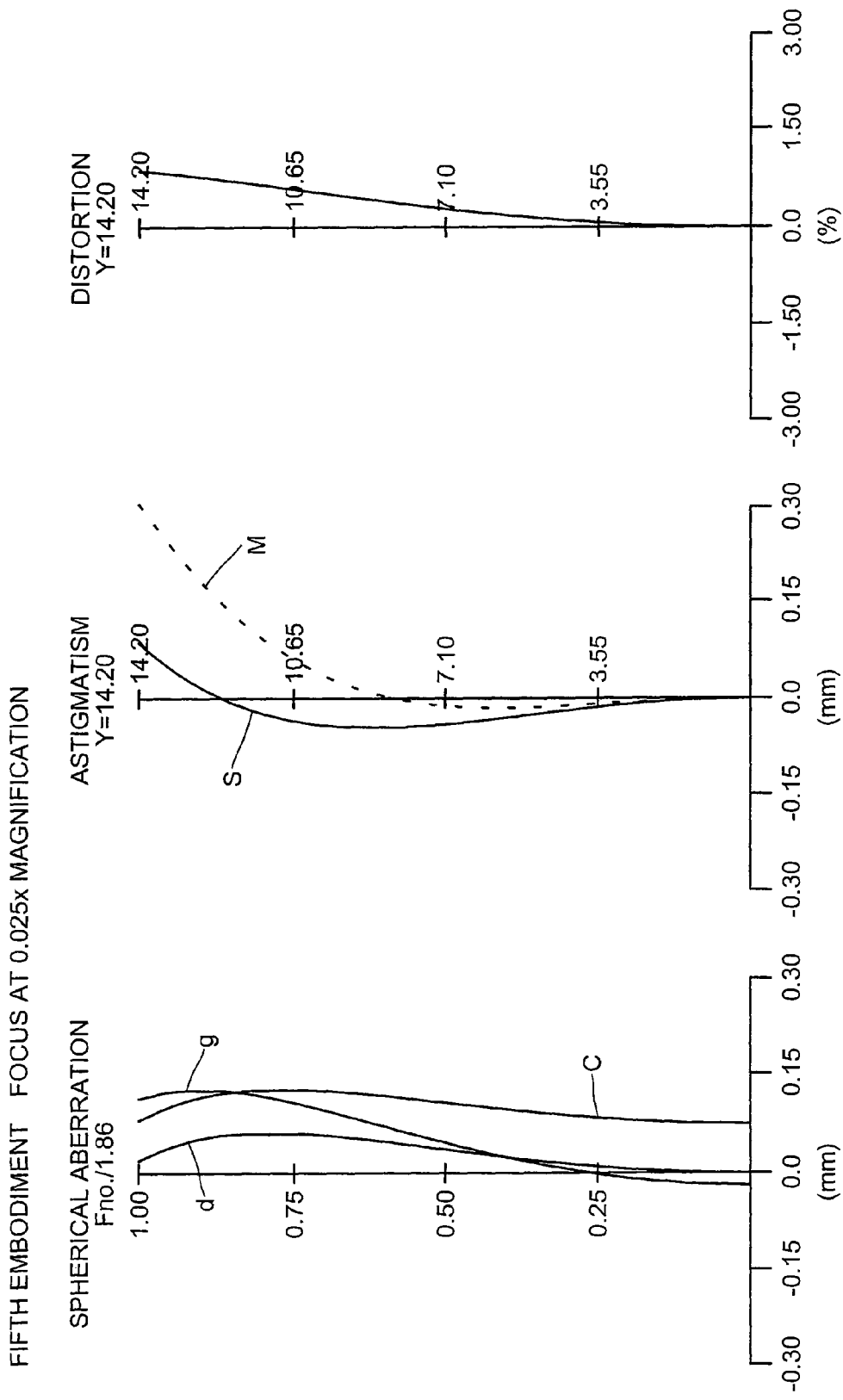
FIG. 19 is a diagram of various types of aberration occurring with focusing at 0.025× magnification in the internal focus lens according to the fifth embodiment.
Figure 20:
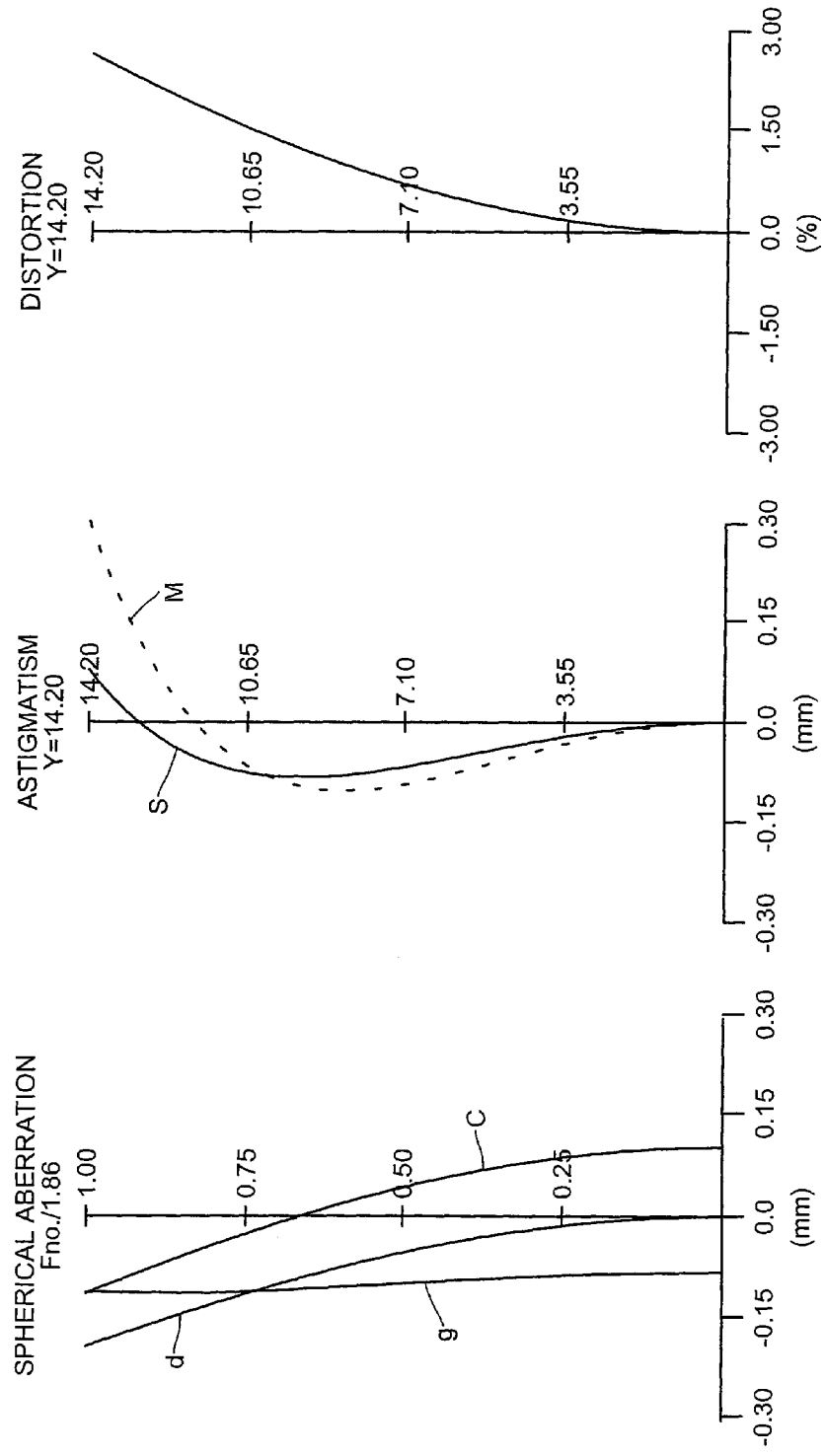
FIG. 20 is a diagram of various types of aberration occurring with focusing at the minimum object distance in the internal focus lens according to the fifth embodiment.

FIG. 18 is a diagram of various types of aberration occurring at infinity focus in the internal focus lens according to the fifth embodiment. FIG. 19 is a diagram of various types of aberration occurring with focusing at 0.025× magnification in the internal focus lens according to the fifth embodiment. FIG. 20 is a diagram of various types of aberration occurring with focusing at the minimum object distance in the internal focus lens according to the fifth embodiment. In the diagrams, g, d, and C represent wavelength aberration at g-line (λ=435.83 nm), at d-line (λ=587.56 nm), and at C-line (λ=656.28 nm), respectively. Furthermore, in the drawings, S and M shown with respect to astigmatism, respectively indicate aberration at the sagittal image plane and at the meridonal image plane.

Figure 21:
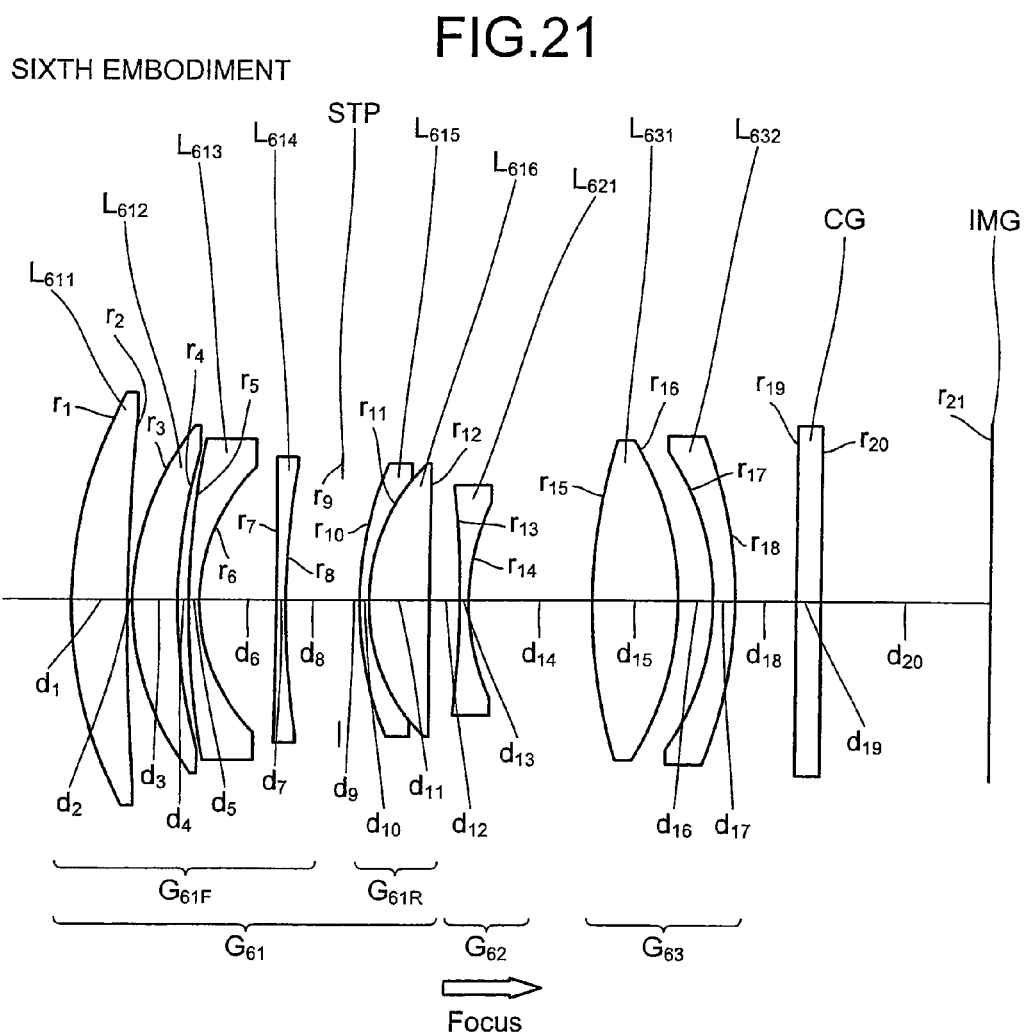
FIG. 21 is a cross sectional view (along an optical axis) of the internal focus lens according to a sixth embodiment.

FIG. 21 is a cross sectional view (along an optical axis) of the internal focus lens according to a sixth embodiment. The internal focus lens includes sequentially from the object side, a first lens group $G_{61}$ having a positive refractive power, a second lens group $G_{62}$ having a negative refractive power, and a third lens group $G_{63}$ having a positive refractive power. Between the third lens group $G_{63}$ and the imaging plane IMG, the cover glass CG is disposed. The cover glass CG is disposed as necessary and may be omitted when not necessary. At the imaging plane IMG, the light receiving surface of an imaging sensor such as a CCD, CMOS, etc. is disposed.

The first lens group $G_{61}$ includes sequentially from the object side, a front group $G_{61F}$, having a negative refractive power, the aperture stop STP prescribing a given aperture, and a rear group $G_{61R}$ having a positive refractive power. The front group $G_{61F}$ includes sequentially from the object side, a positive lens $L_{611}$, a positive lens $L_{612}$, a negative lens $L_{613}$, and a negative lens $L_{614}$. The rear group $G_{61R}$ includes sequentially from the object side, a negative lens $L_{615}$ and a positive lens $L_{616}$. The negative lens $L_{615}$ and the positive lens $L_{616}$ are cemented. The lens configuration of the first lens group $G_{61}$ is substantially symmetrical about the aperture stop STP. The first lens group $G_{61}$ is fixed and does not move during focusing.

The second lens group $G_{62}$ is configured by a negative lens $L_{621}$. The second lens group $G_{62}$ is moved along the optical axis, from the object side toward the imaging plane IMG, whereby focusing from infinity focus to focus at the minimum object distance is performed.

The third lens group $G_{63}$ includes sequentially from the object side, a positive lens $L_{631}$ and a negative lens $L_{632}$. The third lens group $G_{63}$ is also fixed and does not move during focusing.

Here, various values related to the internal focus lens according to the sixth embodiment are given.

(Lens Data)

| | | | |
|---|---|---|---|
| $r_1 = 34.5436$ | | | |
| $d_1 = 4.5381$ | $nd_1 = 1.83481$ | $vd_1 = 42.72$ | |
| $r_2 = 179.2518$ | | | |
| $d_2 = 0.4000$ | | | |
| $r_3 = 22.4980$ | | | |
| $d_3 = 3.6003$ | $nd_2 = 1.83481$ | $vd_2 = 42.72$ | |
| $r_4 = 42.4882$ | | | |
| $d_4 = 0.9115$ | | | |
| $r_5 = 64.4851$ | | | |
| $d_5 = 0.9000$ | $nd_3 = 1.72825$ | $vd_3 = 28.32$ | |
| $r_6 = 14.8938$ | | | |
| $d_6 = 6.2808$ | | | |
| $r_7 = -700.0000$ | | | |
| $d_7 = 0.8000$ | $nd_4 = 1.72825$ | $vd_4 = 28.32$ | |
| $r_8 = 63.9398$ | | | |
| $d_8 = 4.4972$ | | | |
| $r_9 = \infty$ (aperture stop) | | | |
| $d_9 = 1.5000$ | | | |
| $r_{10} = 26.7105$ | | | |
| $d_{10} = 0.8000$ | $nd_5 = 1.84666$ | $vd_5 = 23.78$ | |
| $r_{11} = 15.2311$ | | | |
| $d_{11} = 4.9795$ | $nd_6 = 1.91082$ | $vd_6 = 35.25$ | |
| $r_{12} = 952.6522$ | | | |
| $d_{12} = D(12)$ (variable) | | | |
| $r_{13} = -73.1046$ | | | |
| $d_{13} = 0.7000$ | $nd_7 = 1.603$ | $vd_7 = 65.44$ | |
| $r_{14} = 18.3813$ | | | |
| $d_{14} = D(14)$ (variable) | | | |
| $r_{15} = 42.9853$ | | | |
| $d_{15} = 7.0000$ | $nd_8 = 1.72916$ | $vd_8 = 54.67$ | |
| $r_{16} = -24.2634$ | | | |
| $d_{16} = 2.8527$ | | | |
| $r_{17} = -20.8317$ | | | |
| $d_{17} = 1.8000$ | $nd_9 = 1.80809$ | $vd_9 = 22.76$ | |
| $r_{18} = -34.3598$ | | | |
| $d_{18} = 5.0000$ | | | |
| $r_{19} = \infty$ | | | |
| $d_{19} = 2.0000$ | $nd_{10} = 1.5168$ | $vd_{10} = 64.2$ | |
| $r_{20} = \infty$ | | | |
| $d_{20} = 13.8539$ | | | |
| $r_{21} = \infty$ (imaging plane) | | | |

(Values for focusing states)

| | Infinity | 0.025x | Min. object dist. (0.144x) |
|---|---|---|---|
| D(12) | 2.469 | 3.218 | 6.784 |
| D(14) | 10.119 | 9.370 | 5.806 |
| image height(Y) | 14.20 | 14.20 | 14.20 | f (focal length of entire optical system) = 51.50
Fno = 1.82
ω(half-angle) = 15.55
minimum object distance = 0.450
f1(focal length of first lens group $G_{61}$) = 39.57
f2(focal length of second lens group $G_{62}$) = −24.29
f3(focal length of third lens group $G_{63}$) = 30.90
f3n(focal length of negative lens $L_{632}$) = −69.61
(Values related to conditional expression (1))
|f3|/f = 0.60
(Values related to conditional expression (2))
Fno × f1/f = 1.40
(Values related to conditional expression (3))
|f3n|/f = 1.35
(Values related to conditional expression (4))
|f2|/f = 0.47
(Values related to conditional expression (5))
nd(refractive index at d-line of second lens group $G_{62}$) = 1.603
(Values related to conditional expression (6))
vd(Abbe number at d-line of second lens group $G_{62}$) = 65.44

Figure 22:
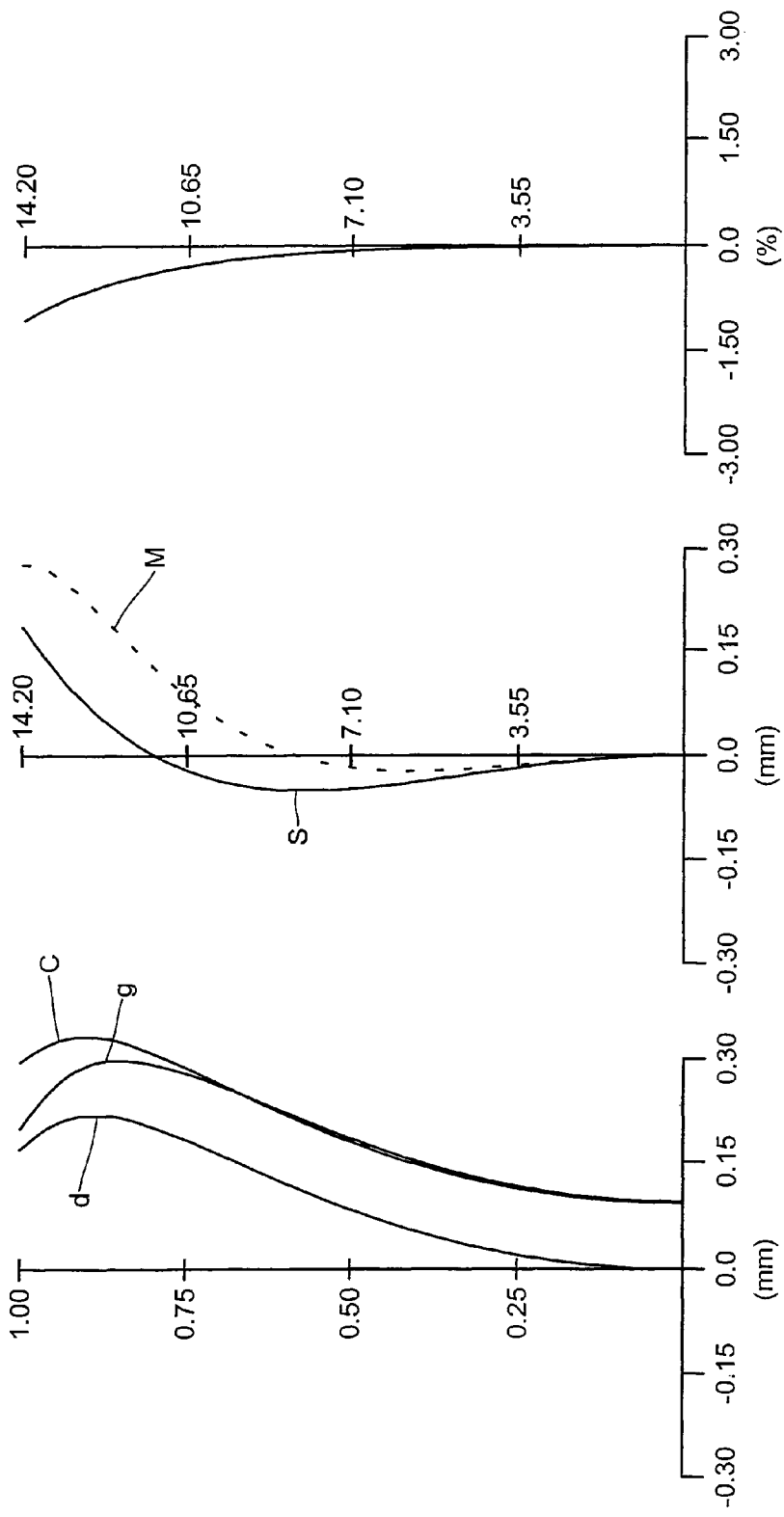
FIG. 22 is a diagram of various types of aberration occurring at infinity focus in the internal focus lens according to the sixth embodiment.
Figure 23:
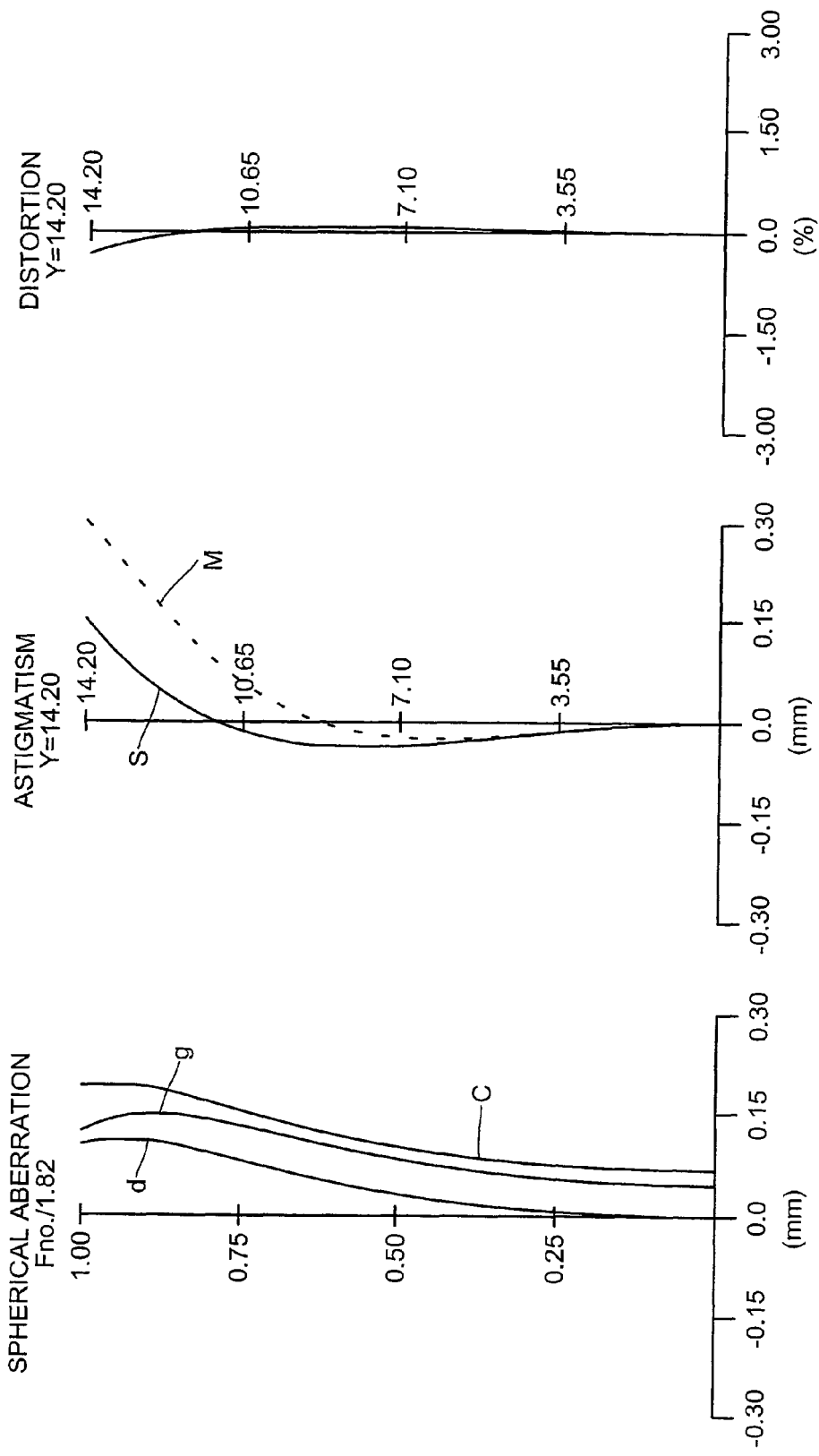
FIG. 23 is a diagram of various types of aberration occurring with focusing at 0.025× magnification in the internal focus lens according to the sixth embodiment.
Figure 24:
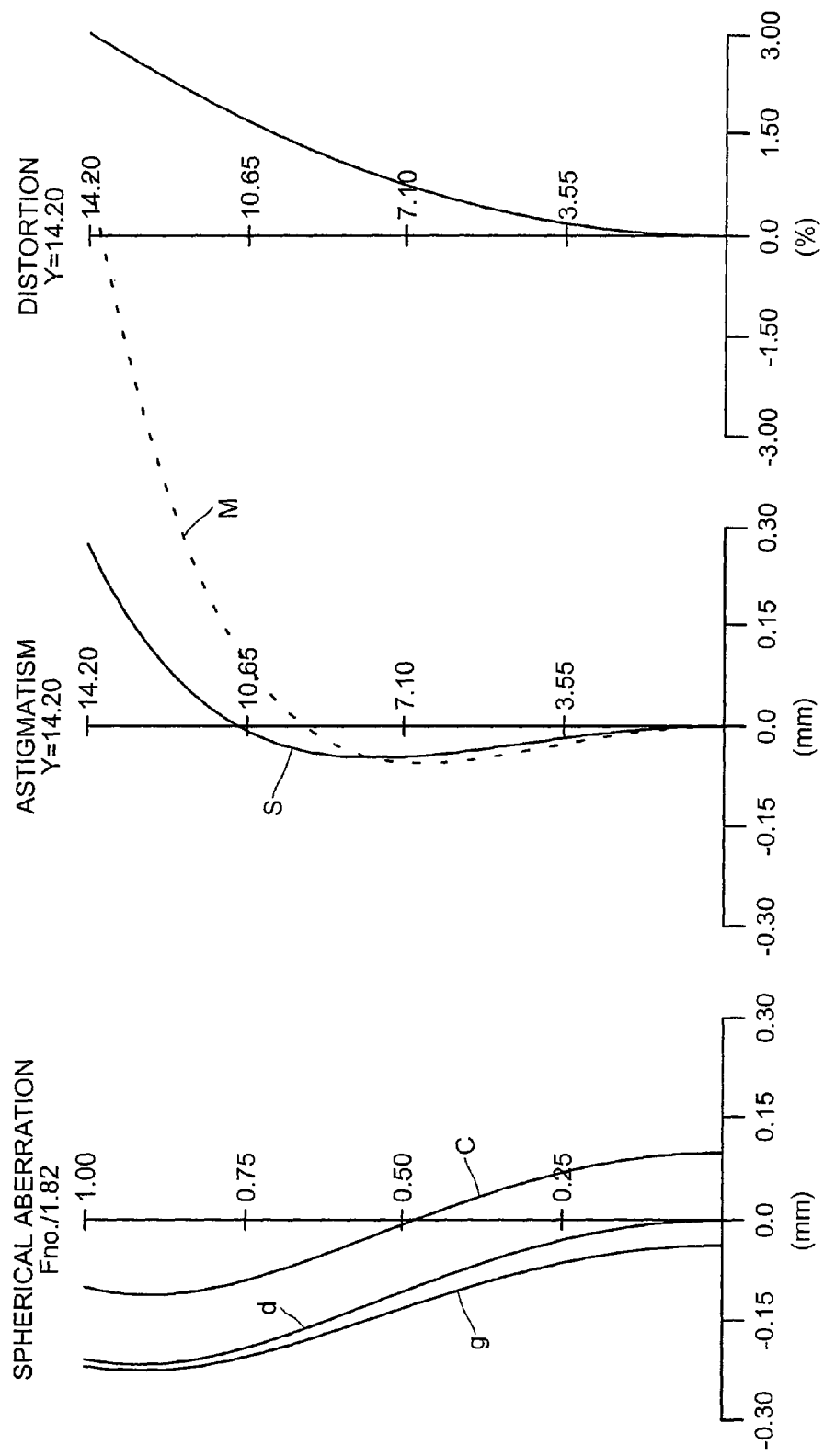
FIG. 24 is a diagram of various types of aberration occurring with focusing at the minimum object distance in the internal focus lens according to the sixth embodiment.

FIG. 22 is a diagram of various types of aberration occurring at infinity focus in the internal focus lens according to the sixth embodiment. FIG. 23 is a diagram of various types of aberration occurring with focusing at 0.025× magnification in the internal focus lens according to the sixth embodiment. FIG. 24 is a diagram of various types of aberration occurring with focusing at the minimum object distance in the internal focus lens according to the sixth embodiment. In the diagrams, g, d, and C represent wavelength aberration at g-line (λ=435.83 nm), at d-line (λ=587.56 nm), and at C-line (λ=656.28 nm), respectively. Furthermore, in the drawings, S and M shown with respect to astigmatism, respectively indicate aberration at the sagittal image plane and at the meridonal image plane.

Among the values for each of the examples above, $r_1$, $r_2$, . . . indicate radii of curvature for each lens, diaphragm surface, etc.; $d_1$, $d_2$, . . . indicate the thickness of the lenses, diaphragm, etc. or the distance between surfaces thereof; $nd_1$, $nd_2$, . . . indicate the refractive index of each lens with respect to the d-line (λ=587.56 nm), and $vd_1$, $vd_2$, . . . indicate the Abbe number with respect to the d-line (λ=587.56 nm). The minimum object distance is indicated in [m], other lengths are indicated in units of [mm] and angles are indicated in [degrees].

As described, the internal focus lens according to each embodiment includes the second lens group, which performs focusing and is configured by a simple lens element, and maintains the first lens group and the third lens group in a fixed state, thereby enabling a light-weight optical system of a relatively short length to be implemented. Further, the disposal of the aperture stop at a proper position within the first lens group effects excellent correction of various types of aberration and further enables the front lens diameter of the optical system to be reduced. By further satisfying the conditional expressions above, an internal focus lens that is yet smaller, lighter, and has excellent imaging performance can be implemented.

As described, the internal focus lens according to the invention is useful for photographic cameras, video cameras, etc. and is particularly suitable for imaging apparatuses of which compactness, intermediate telephoto views, a large diameter are demanded.

According to the present invention, an internal focus lens when implemented on a 35 mm equivalent focal length camera, has an intermediate focal length, is compact, light weight, has a large diameter, and excellent imaging performance can be provided.

According to the present invention, imaging performance can be improved without sacrifice to reductions in the size of the optical system.

According to the present invention, reductions in the total length of the optical system can be achieved while further improving imaging performance. In particular, chromatic difference of magnification can be favorably corrected.

According to the present invention, a compact, large diameter optical system can be implemented.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2011-114188 filed in Japan on May 20, 2011.

What is claimed is:

1. An internal focus lens comprising sequentially from an object side:
a first lens group having a positive refractive power;
a second lens group having a negative refractive power; and
a third lens group having a positive refractive power, wherein
the second lens group is configured by a simple lens element,
the second lens group is moved along an optical axis to perform focusing, and
condition expressions (1) and (2) are satisfied:

$$0.48 < |f3|/f < 0.73 \quad (1)$$

$$1.05 < Fno \times f1/f < 1.42 \quad (2)$$

where, f3 is the focal length of the third lens group, f is the focal length of the entire optical system, f1 is the focal length of the first lens group, and Fno is the F number of the entire optical system.

2. The internal focus lens according to claim 1, wherein
the third lens group includes at least one positive lens and a negative lens that is disposed farthest on an image side of the third lens group, and
conditional expression (3) $0.85 < |f3n|/f < 2.40$ is satisfied,
where f3n is the focal length of the negative lens disposed farthest on the image side of the third lens group.

3. The internal focus lens according to claim 1, wherein
conditional expression (4) $0.38 < |f2|/f < 0.72$ is satisfied,
where f2 is the focal length of the second lens group.

4. The internal focus lens according to claim 1, wherein conditional expression (5) and (6) are satisfied:

$$nd \geq 1.603 \quad (5)$$

$$\upsilon d > 60.3 \quad (6)$$

where, nd is the refractive index at d-line of the second lens group, and υd is the Abbe number at d-line of the second lens group.

5. The internal focus lens according to claim 1, wherein
the first lens group includes sequentially from the object side, a front group having a negative refractive power, an aperture stop, and a rear group having a positive refractive power, wherein
the rear group includes a cemented lens formed by a negative lens and a positive lens.

* * * * *